US010471571B2

(12) United States Patent
Flaschberger et al.

(10) Patent No.: US 10,471,571 B2
(45) Date of Patent: Nov. 12, 2019

(54) BONDED ABRASIVE ARTICLE

(71) Applicant: 3M INNOVATIVE PROPERTIES COMPANY, St. Paul, MN (US)

(72) Inventors: Walter Flaschberger, Villach (AU); Andrea Veronika Kirschner, Villach (AU)

(73) Assignee: 3M Innovative Properties Company, St. Paul, MN (US)

( * ) Notice: Subject to any disclaimer, the term of this patent is extended or adjusted under 35 U.S.C. 154(b) by 1 day.

(21) Appl. No.: 14/773,985

(22) PCT Filed: Mar. 12, 2013

(86) PCT No.: PCT/IB2013/051942
§ 371 (c)(1),
(2) Date: Sep. 9, 2015

(87) PCT Pub. No.: WO2014/140689
PCT Pub. Date: Sep. 18, 2014

(65) Prior Publication Data
US 2016/0023328 A1    Jan. 28, 2016

(51) Int. Cl.
C09K 3/14        (2006.01)
B24D 3/14        (2006.01)
(Continued)

(52) U.S. Cl.
CPC ............... *B24D 3/14* (2013.01); *B24B 53/07* (2013.01); *B24D 5/02* (2013.01); *B24D 5/14* (2013.01); *C09K 3/1409* (2013.01)

(58) Field of Classification Search
USPC .......................................... 51/309, 298, 307
See application file for complete search history.

(56) References Cited

U.S. PATENT DOCUMENTS 1,910,444 A     5/1933   Nicholson
3,041,156 A     6/1962   Rowse
(Continued)

FOREIGN PATENT DOCUMENTS

EP        1 598 147       11/2005
WO     WO2011/068714     6/2011
(Continued)

OTHER PUBLICATIONS

"NLREG—Nonlinear Regression Analysis Program"; "NLREG", available from Phillip Sherrod, Brentwood, Tenn., obtained from www.NLREG.com; pp. 1-92 Copyright © 1991-2010.

*Primary Examiner* — James E McDonough
(74) *Attorney, Agent, or Firm* — Katherine M. Scholz; David B. Patchett

(57) ABSTRACT

The present invention relates to a bonded abrasive article comprising shaped abrasive particles and a bonding medium comprising a vitreous bond, said shaped abrasive particles each comprising a first side and a second side separated by a thickness t, wherein said first side comprises a first face having a perimeter of a first geometric shape, wherein said thickness t is equal to or smaller than the length of the shortest side-related dimension of the particle, wherein the article exhibits at least on a part of its surface a surface profile comprising at least one surface feature wherein said shaped abrasive particles have a largest dimension of about the same order of magnitude or larger as compared to said surface feature. The present invention also relates to a composition for use of the preparation of a bonded abrasive article, to methods of preparing and using the bonded abrasive article and to methods of grinding and providing a workpiece.

22 Claims, 4 Drawing Sheets

(51) Int. Cl.
  *B24B 53/07* (2006.01)
  *B24D 5/02* (2006.01)
  *B24D 5/14* (2006.01)
  *B24D 3/00* (2006.01)
  *B24D 11/00* (2006.01)
  *B24D 18/00* (2006.01)

(56) References Cited

U.S. PATENT DOCUMENTS

| | | |
|---|---|---|
| 4,182,082 A | 1/1980 | Meyer |
| 4,314,827 A | 2/1982 | Leitheiser |
| 4,623,364 A | 11/1986 | Cottringer |
| 4,744,802 A | 5/1988 | Schwabel |
| 4,770,671 A | 9/1988 | Monroe |
| 4,881,951 A | 11/1989 | Wood |
| 4,997,461 A | 3/1991 | Markhoff-Matheny |
| 5,009,675 A | 4/1991 | Kunz |
| 5,011,508 A | 4/1991 | Wald |
| 5,042,991 A | 8/1991 | Kunz |
| 5,085,671 A | 2/1992 | Martin |
| 5,152,917 A | 10/1992 | Pieper |
| 5,164,348 A | 11/1992 | Wood |
| 5,201,916 A | 4/1993 | Berg |
| 5,213,591 A | 5/1993 | Celikkaya |
| 5,352,254 A | 10/1994 | Celikkaya |
| 5,366,523 A | 11/1994 | Rowenhorst |
| 5,435,816 A | 7/1995 | Spurgeon |
| 5,551,963 A | 9/1996 | Larmie |
| 5,645,619 A | 7/1997 | Erickson |
| 5,672,097 A | 9/1997 | Hoopman |
| 5,958,794 A | 8/1999 | Bruxvoort |
| 5,946,991 A | 9/1999 | Hoopman |
| 5,975,987 A | 11/1999 | Hoopman |
| 6,129,540 A | 10/2000 | Hoopman |
| 6,277,161 B1 | 8/2001 | Castro |
| 2004/0023599 A1 | 2/2004 | Tunstall |
| 2009/0165394 A1 | 7/2009 | Culler |
| 2009/0169816 A1 | 7/2009 | Erickson |
| 2010/0146867 A1 | 6/2010 | Boden |
| 2010/0151195 A1* | 6/2010 | Culler .............. B24D 11/00 428/142 |
| 2010/0151196 A1 | 6/2010 | Adefris |
| 2010/0151201 A1 | 6/2010 | Erickson |
| 2010/0219269 A1* | 9/2010 | Husband ............ C01F 11/185 241/16 |
| 2010/0319269 A1* | 12/2010 | Erickson .......... B24D 11/00 51/295 |
| 2013/0000216 A1 | 1/2013 | Wang |
| 2013/0203328 A1* | 8/2013 | Givot ............... B24D 5/02 451/548 |
| 2015/0224625 A1* | 8/2015 | Lehuu ............... B24B 53/017 451/442 |

FOREIGN PATENT DOCUMENTS

| | | |
|---|---|---|
| WO | WO2011/109188 | 9/2011 |
| WO | WO 2011/139562 | 11/2011 |

* cited by examiner

Form 1    Form 39    Form 39E    Form 1ESP 1 mm

BONDED ABRASIVE ARTICLE

The present invention relates to bonded abrasive articles, particularly those which are useful in high precision grinding. Bonded abrasive articles for high precision grinding are useful for accurately grinding a workpiece to a desired shape and size.

Bonded abrasive articles have abrasive particles bonded together by a bonding medium. The main types of bonding systems used to make bonded abrasive articles are: resinoid, vitrified, and metal. Resinoid bonded abrasives utilize an organic binder system (e.g., phenolic binder systems) to bond the abrasive particles together to form the shaped mass. Another major type are bonded abrasive articles (for example vitrified bonded wheels) in which a vitreous binder system is used to bond the abrasive particles together. These bonds are usually vitrified at temperatures between 700° C. to 1500° C. Metal bonded abrasive articles typically utilize sintered or plated metal to bond the abrasive particles. Vitrified bonded abrasive articles are different from resinoid bonded abrasive articles in that they use a vitreous phase to bond the abrasive grain and thus are processed at substantially higher temperatures. Vitrified bonded abrasive articles can withstand higher temperatures in use and are generally more rigid and brittle than resinoid bonded wheels.

Bonded abrasives are three-dimensional in structure and typically include a shaped mass of abrasive particles, held together by the binder. Such shaped mass can be, for example, in the form of a wheel, such as a grinding wheel.

Bonded abrasive articles having on at least a part of their surface a surface profile are useful for many grinding applications, in particular for grinding applications imparting a profile to a workpiece. Specific examples include but are not limited to thread grinding, gear grinding, surface grinding, cylindrical grinding, to name only a few.

In the ideal situation, the bonded abrasive article is self-sharpening. However, in reality, particularly, when the forces get high enough, the bonded abrasive articles can break down, breaking and ejecting abrasive particles. The grinding power drawn decreases beyond the starting value of the grinding application as the bonded abrasive article wears away rapidly and loses its preferred shape. Bonded abrasive articles therefore typically show cyclical grinding curves (grinding power consumption as a function of grinding time). At the end point of a grinding cycle dressing of the bonded abrasive article (such as a grinding wheel) has to be set up in order to avoid defects at the workpiece to be abraded and in order to provide for constant abrading performance of the bonded abrasive article.

As the bonded abrasive article is used, it thus slowly wears away, causing changes in the geometry of the three-dimensional shape of the bonded abrasive article, for example in the shape of the surface profile (which typically becomes "less sharp" and "more flattened" during use) and the diameter of a grinding wheel. As a result of the changes in the geometry of the bonded abrasive article, the desired accuracy of the final ground workpiece cannot be maintained and decreases. In order to achieve the desired accuracy for the workpiece, the bonded abrasive article must therefore be periodically reshaped and resized or "dressed", typically by using a dressing device. Dressing is typically performed using a dressing tool such as a diamond dressing tool.

During dressing, the bonded abrasive article and the dressing device are brought into contact with one another (in the dressing contact region) and one or both of them are caused to move relative to each other. Dressing causes the surface of the dressing device to remove particles and/or bond from the surface of the bonded abrasive article, thereby reshaping its surface.

However, in conventional bonded abrasive article, abrasive particles that are removed upon dressing are typically dislodged (or pulled) from the bond thereby leaving empty spaces at the original locations of the abrasive particles in the abrasive article. As a result, it can be difficult to create (before the article is used for the first time) or re-create (after the article has worn) the ideal surface profile of the article in particular in tip regions of the profile. Due to particles being dislodged from the bond (either during wearing and/or also during dressing), the tip regions of the profile are more prone to wearing and can be difficult to be (re)dressed completely to the ideal shape. This can result in undesirable flattening or truncation of feature, particularly of the tip regions of the surface profile of the bonded abrasive article. Other features, such as corners present for example in flanks of a profile feature may show similar flattening and/or truncation. When a bonded abrasive article exhibiting truncation in tip regions is used for imparting a final workpiece profile, the truncations in the tip regions of the bonded abrasive article may give rise to corresponding truncations in root regions of the final workpiece profile. A flattened corner, for example in a flank of a profile, may give rise to correspondingly flattened complementary corners in the final workpiece profile. Hence, it is often difficult to provide final workpiece profiles having sharp surface features, such as root regions or corner regions.

It can thus be difficult to accurately (re)create very small surface features (in particular very sharp tip regions) to a bonded abrasive article. Creating (before the article is used for the first time) or re-creating (i.e., when the article has worn) a surface profile, for example by dressing, becomes more difficult with decreasing dimension of the surface feature(s), particularly in tip regions or corner regions of the profile.

Prior to the present invention there was therefore a general understanding in the art that accurately (re)creating a profile having very small surface features (in particular in tip regions of the profile) in a bonded abrasive article requires the use of abrasive particles (conventional particles, for example, crushed particles) having nominal sizes much smaller than the dimension of the feature to be (re)created, typically sizes of at least about one order of magnitude smaller.

In the preparation of bonded abrasive articles having on at least a part of their surface a surface profile, abrasive particles are therefore conventionally selected according to the general understanding in the art that the use of suitable abrasive particles is limited to those having nominal size(s) being about one order of magnitude smaller than the surface feature to be (re)created.

By way of illustration, (re)creating a surface feature (for example, a pitch of a thread) having a dimension of about 1500 μm typically would have been thought to require (with exemplary reference to a single rib thread grinding application) abrasive particles sizes not greater than according to FEPA grade F240 (corresponding to a mean particle size of about 45 μm), (re)creating a surface feature (for example, a pitch of a thread) having a dimension of about 700 μm to 1000 μm typically would have been thought to require abrasive particle sizes not greater than ranging from according to FEPA grade F320 (corresponding to a mean particle size of about 30 μm) to FEPA grade F400 (corresponding to a mean particle size of about 18 μm), and a (re)creating a surface feature (for example, a pitch of a thread) having a dimension of as fine as about 300 to about 600 µm would have been thought to typically require a abrasive particle sizes not greater than ranging from according to FEPA grade F400 (corresponding to a mean particle size of about 18 µm) to FEPA grade F500 (corresponding to a mean particle size of about 13 µm).

While conventional recommendations may vary slightly depending on the specific grinding application, they are all based on the understanding that suitable abrasive particles have to exhibit particles sizes (typically, nominal sizes) being about one order of magnitude smaller (i.e. typically by factor 10, 20, 30 or even smaller) than the surface feature to be (re)created.

Selecting fine enough particle sizes might in some instances represent one way of achieving small surface features in the surface profile of a bonded abrasive article.

However, this method is still limited, particularly with respect to the sharpness of tip regions in the surface profile of the bonded abrasive article. Furthermore, this method is dependent on availability of suitable grit sizes. Moreover, for a given grinding operation many factors such as the material to be ground and its hardness, the quantity of material to be abraded (stock removal or surface finish), the grinding process conditions (for example wet or dry), or the type of grinding machine have to be carefully considered. As a result, the grit size that would be required for the (re) creation of a small surface feature might not be the ideal grit size under other aspects of the given grinding operation (such as quantity of material to be abraded).

In other words, in a bonded abrasive article incorporating abrasive particles of a given grit size (as desired or necessary for a specific grinding application) profile surface features, in particular those in tip regions, cannot be scaled down to any size.

Surprisingly, it has now been found that a vitrified bonded composition comprising shaped abrasive particles as defined herein and a bonding medium comprising a vitreous bond can provide bonded abrasive articles which can solve the aforementioned problems. Such articles have been found to be particularly effective in high precision grinding applications.

In one aspect, the present invention relates to a vitrified bonded composition for use of the preparation of a bonded abrasive article, said vitrified bonded composition comprising shaped abrasive particles (typically a plurality of shaped abrasive particles) as defined herein and a bonding medium comprising a vitreous bond, wherein said bonded abrasive article exhibits at least on a part of its surface a surface profile comprising at least one surface feature wherein said shaped abrasive particles have a largest dimension of about the same order of magnitude or larger as compared to said surface feature. Said surface feature is typically a male surface feature. Preferably, the height of said male surface feature has a dimension of about 0.1 to about 9 times the largest dimension of said shaped abrasive particles. Preferably said male surface feature exhibits a tip radius R(tip), wherein said tip radius R(tip) and the largest dimension $L_{max}$ of said shaped abrasive particles are characterized by R(tip)≤2 $L_{max}$.

In a further aspect, the present invention relates to a bonded abrasive article comprising a plurality of shaped abrasive particles and a bonding medium comprising a vitreous bond, said shaped abrasive particles each comprising a first side and a second side separated by a thickness t, wherein said first side comprises a first face having a perimeter of a first geometric shape, wherein said thickness t is equal to or smaller than the length of the shortest side-related dimension of the particle, wherein the article exhibits at least on a part of its surface a surface profile comprising at least one surface feature wherein said shaped abrasive particles have a largest dimension of about the same order of magnitude or larger as compared to said surface feature. Said surface feature is typically a male surface feature. Preferably, the height of said male surface feature has a dimension of about 0.1 to about 9 times the largest dimension of said shaped abrasive particles. Preferably said male surface feature exhibits a tip radius R(tip), wherein said tip radius R(tip) and the largest dimension $L_{max}$ of said shaped abrasive particles are characterized by R(tip)≤2 $L_{max}$.

In a further aspect, the present invention relates to a method for producing a bonded abrasive article, the process comprising (a) providing a precursor vitrified bonded abrasive article having a basis shape; (b) imparting on at least a part of said surface of said precursor vitrified bonded abrasive article a surface profile comprising at least one surface feature wherein said shaped abrasive particles have a largest dimension of about the same order of magnitude or larger as compared to said surface feature, wherein step (b) preferably comprises dressing. Said surface feature is typically a male surface feature. Preferably, the height of said male surface feature has a dimension of about 0.1 to about 9 times the largest dimension of said shaped abrasive particles. Preferably said male surface feature exhibits a tip radius R(tip), wherein said tip radius R(tip) and the largest dimension $L_{max}$ of said shaped abrasive particles are characterized by R(tip)≤2 $L_{max}$ (preferably by R(tip)≤$L_{max}$ and even more preferably by R(tip)≤0.5 $L_{max}$).

The present invention further relates to a method for preparing a workpiece having on at least a part of its surface a profile, the method comprising: (1) providing a workpiece having an initial shape, (2) frictionally contacting at least a portion of the abrasive article according to the present invention with a surface of said workpiece; and (3) moving at least one of the workpiece or the abrasive article so as to abrade at least a portion of the surface of the workpiece, to provide a final workpiece having on at least a part of its surface a final surface profile which at least partially corresponds to the surface profile of the bonded abrasive article. According to a preferred embodiment said final workpiece surface profile comprises at least one final workpiece surface feature, wherein said shaped abrasive particles have a largest dimension of about the same order of magnitude or larger as compared to said at least one final workpiece surface feature. In a preferred embodiment, said surface profile comprises at least one female surface feature exhibiting a root radius R(root), wherein said root radius R(root) and the largest dimension $L_{max}$ of said shaped abrasive particles are characterized by R(root)≤2 $L_{max}$.

The present invention also relates to methods of grinding characterized by using a bonded abrasive article according to the present invention, in particular to methods of thread grinding, methods of gear grinding, methods of surface grinding, and methods of cylindrical grinding.

The bonded abrasive articles according to the present invention are particularly useful for accurately imparting an intended shape (for example, a surface profile) to a workpiece.

Figure 4:
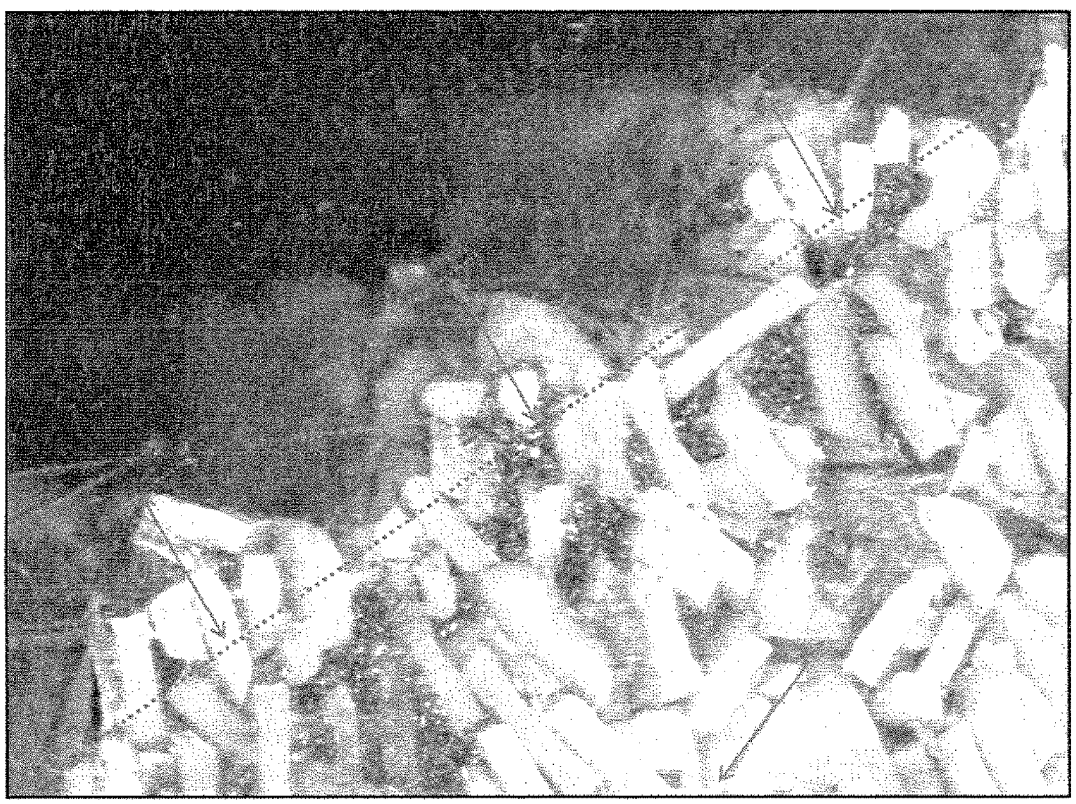

FIG. 4. shows an image of a cross section of the bonded abrasive article of Example 1 (after having been used in a grinding application and before dressing) wherein the height of the surface feature (the height of the rails) is approximately equivalent to the side dimension of the shaped abrasive particles and wherein both dimensions are approximately 0.5 mm (note the face of the triangular shaped abrasive particle at the lower left of the photo).

As used herein the term "high precision grinding" is used to refer to grinding applications which are useful to grind a workpiece with high accuracy.

As used herein the term "active surface" when used in relation to a bonded abrasive article relates to the surface of the article which is in contact with the workpiece during grinding. For example with specific reference to a grinding wheel, the active surface relates to the circumferential surface of the wheel rather than to the two side surfaces of the wheel (the circumferential surface of a wheel is also sometimes simply referred to as "face" of the wheel).

As used herein, the term "shaped abrasive particle", means an abrasive particle with at least a portion of the abrasive particle having a predetermined shape that is replicated from a mold cavity used to form the shaped precursor abrasive particle. Except in the case of abrasive shards (e.g. as described in US Patent Application Publication Nos. 2009/0169816 and 2009/0165394), shaped abrasive particles in accordance with the present invention will generally have a predetermined geometric shape that substantially replicates the mold cavity that was used to form the shaped abrasive particle. Typically, shaped abrasive particles replicated from a mold can be characterized in that each of the particles has substantially the same shape (i.e. the shape that is predetermined by the mold from which the shape is replicated). In contrast, in a plurality of abrasive particles prepared by extrusion (such as extruded rods), the shape of the particles may still differ slightly, for example in that the individual particles may have different grades of curvature along their lengths. As a result of the predetermined geometric shape, a plurality of shaped abrasive particles (replicated from the same mold) will typically not show a pronounced distribution of particle sizes. Shaped abrasive particles can be described through a very narrow size distribution as compared to conventional crushed abrasives. Shaped abrasive particles can be attributed with a nominal size based on methods known in the art such as sieving using for example US standard mesh sizes. Typically, shaped abrasive particles can be attributed with a nominal size based on particle dimensions, such as same edge length, same particle height, as well as fitting through the same mesh size. Substantially the same length means the common edges or height have a lengths within +/±20 percent of a nominal length or height, respectively. As used herein, the term "nominal" means: of, being, or relating to a designated or theoretical size and/or shape that may vary from the actual.

Shaped abrasive particle as used herein excludes abrasive particles obtained by a mechanical crushing operation (which are typically irregularly shaped and are typically characterized by a distribution of different particle sizes).

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means a precursor (in typical cases an alpha alumina precursor) that can be converted into an abrasive material (for example, alpha alumina) that is introduced into a mold cavity. The composition is referred to as an abrasive dispersion until sufficient volatile components are removed to bring about solidification of the abrasive dispersion.

As used herein, the term "precursor shaped abrasive particle" means the unsintered particle produced by removing a sufficient amount of the volatile component from the abrasive dispersion, when it is in the mold cavity, to form a solidified body that can be removed from the mold cavity and substantially retains its molded shape in subsequent processing operations.

With respect to the three-dimensional shapes of the shaped abrasive particles in accordance with the present invention, the length shall mean the longest particle dimension, the width shall mean the maximum particle dimension perpendicular to the length. The thickness as referred to herein is also typically perpendicular to length and width. In some cases the longest particle dimension may be along a longitudinal axis of the particle, although this is not a necessary requirement.

The largest particle dimension relevant for comparison with a dimension of a surface feature, in particular, a dimension of a male surface feature (such as the height or the width, a corner radius R(corner) or a tip radius R(tip) of a male surface feature) in a surface profile of a bonded abrasive article according to the present invention or for comparison with a female surface feature in a final workpiece profile (such as a root radius R(root) or a complementary corner radius R(corner)' of a female surface feature in a final workpiece surface profile) typically corresponds to the length of the shaped particle.

As used herein, the term "thickness"; when applied to a particle having a thickness that varies over its planar configuration, shall mean the maximum thickness. If the particle is of substantially uniform thickness, the values of minimum, maximum, mean, and median thickness shall be substantially equal. For example, in the case of a triangle, if the thickness is equivalent to "a", the length of the shortest side of the triangle is preferably at least "2a". In the case of a particle in which two or more of the shortest facial dimensions are of equal length, the foregoing relationship continues to hold. In most cases, the shaped abrasive particles are polygons having at least three sides, the length of each side being greater than the thickness of the particle. In the special situation of a circle, ellipse, or a polygon having very short sides, the diameter of the circle, minimum diameter of the ellipse, or the diameter of the circle that can be circumscribed about the very short-sided polygon is considered to be the shortest facial dimension of the particle.

For further illustration, in case of a tetrahedral-shaped abrasive particle, the length would typically correspond to the side length of one triangle side, the width would be the dimension between the tip of one triangle side and perpendicular to the opposite side edge and the thickness would correspond to what is normally referred to as "height of a tetrahedron", that is, the dimension between the vertex and perpendicular to the base (or first side).

If an abrasive particle is prepared in a mold cavity having a pyramidal, conical, frusto-pyramidal, frusto-conical, truncated spherical, or a truncated spheroidal shape, the thickness is determined as follows: (1) in the case of a pyramid or cone, the thickness is the length of a line perpendicular to the base of the particle and running to the apex of the pyramid or cone; (2) in the case of a frusto-pyramid or frusto-cone, the thickness is the length of a line perpendicular to the center of the larger base of the frusto-pyramid or of the frusto-cone and running to the smaller base of the frusto-pyramid or of the frusto-cone; (3) in the case of a truncated sphere or truncated spheroid, the thickness is the length of a line perpendicular to the center of the base of the truncated sphere or truncated spheroid and running to the curved boundary of the truncated sphere or truncated spheroid.

The length of the shortest side-related dimension of the particle is the length of the shortest facial dimension of the base of the particle (if the particle has only one base, typically the first face) or the length of the shortest facial dimension of the larger base of the particle (if the particle has two bases, for example in cases where the second side comprises a second face).

As used herein the term "circular sector" or "circle sector" refers to the portion of a disk enclosed by two radii and an arc, including minor sectors and major sectors.

As used herein the term "circular segment" refers to an area of a circle informally defined as an area which is "cut off" from the rest of the circle by a secant or a chord. The circle segment constitutes the part between the secant and an arc, excluding the circle's center. This is commonly known as Meglio's Area.

As used herein the term "drop shape" is intended to refer to a shape having a perimeter (the path that surrounds the drop shape area) that can be described as consisting of one vertex and one curved line, wherein the vertex is formed at the point wherein the ends of the curved line meet.

Figure 1:
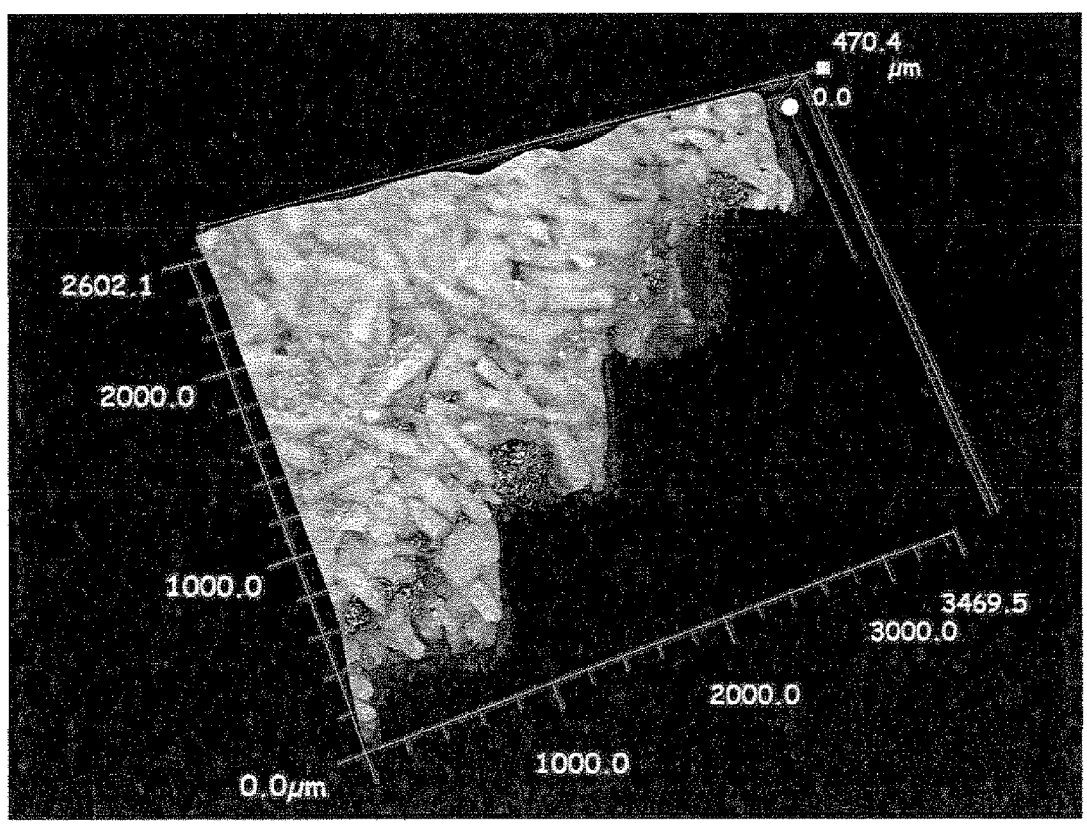
FIG. 1 shows a cross-section of the bonded abrasive article of Example 1 (after grinding and before dressing).
Figure 3:
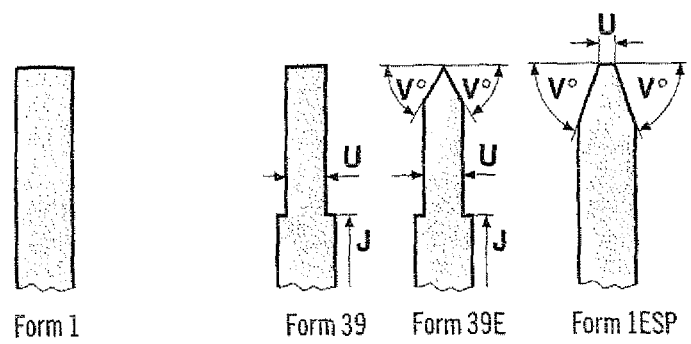
FIG. 3 shows exemplary male surface features which are useful in the present invention.
Figure 3:
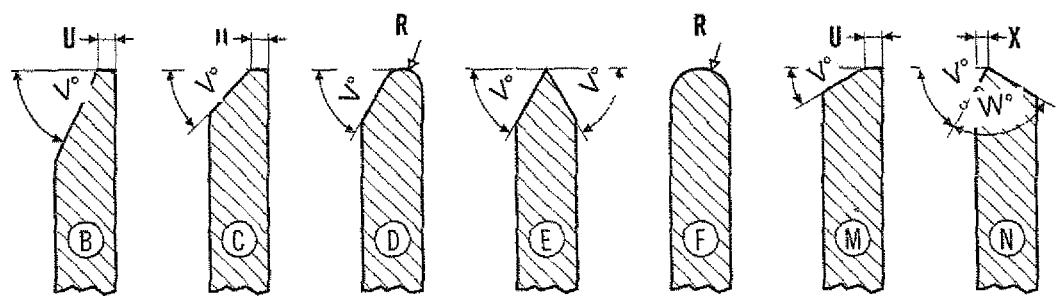

As used herein the term "rhombus" refers to a quadrilateral having four edges of equal length and wherein opposing vertices have included angles of equal degrees as seen in FIGS. 1 and 3 of WO 2011/068714.

As used herein the term "rhomboid" refers to a parallelogram wherein the two intersecting edges on one side of the longitudinal axis are of unequal lengths and a vertex between these edges has an oblique included angle as seen in FIG. 4 of WO 2011/068714.

As used herein the term "kite", as seen in FIG. 5 of WO 2011/068714, refers to a quadrilateral wherein the two opposing edges above a transverse axis are of equal length and the two opposing edges below the transverse axis are of equal length, but have a different length than the edges above the transverse axis. If one took a rhombus and moved one of the opposing major vertices either closer to or further away from the transverse axis a kite is formed.

Figure 2:
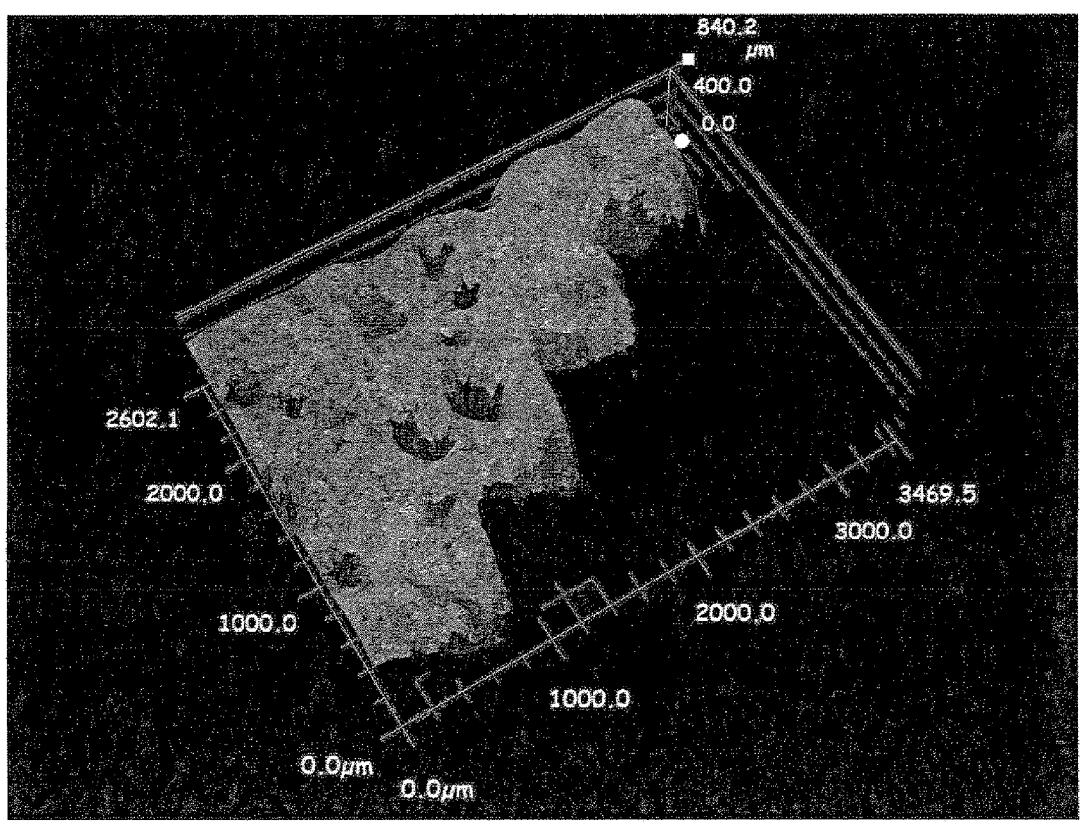
FIG. 2 shows a cross section of a comparative bonded abrasive article comprising the same type of profile as the bonded abrasive article of Example 1 (after grinding and before dressing), but comprising conventional crushed abrasive particles having particle sizes which are much smaller than the surface features of the profile.

As used herein the term "superellipse" refers to a geometric figure defined in the Cartesian coordinate system as the set of all points (x, y) defined by Lamé's curve having the formula $$\left|\frac{x}{a}\right|^n + \left|\frac{y}{b}\right|^n = 1$$

where n, a and b are positive numbers. When n is between 0 and 1, the superellipse looks like a four-armed star with concave edges (without the scallops) as shown in FIG. 2 of WO 2011/068714. When n equals 1, a rhombus a=b or a kite a<>b is formed. When n is between 1 and 2, the edges become convex.

As used herein the term "secondary abrasive particles" is intended to generally refer to abrasive particles which differ from the shaped abrasive particles to be used in accordance with the present invention.

The term "hard materials" as used in the present invention is intended to refer to materials which can typically be characterized as having a Knoop Hardness of 3500 $kg_f/mm^2$ or less (typically, about 1500 to about 3000 $kg_f/mm^2$).

The term "superhard materials" as used in the present invention is intended to refer to materials which can be typically characterized as having a Knoop Hardness of more than 3500 $kg_f/mm^2$ (typically, about 4000 to about 9000 $kg_f/mm^2$).

The term "superabrasives" as used in the present invention is intended to refer to abrasive materials which can be typically characterized as having a Knoop Hardness of 4500 or more than 4500 $kg_f/mm^2$) (typically 4700 to about 9000 $kg_f/mm^2$).

Most oxide ceramics have a Knoop hardness in the range of 1000 to 1500 $kg_f/mm^2$ (10-15 GPa), and many carbides are over 2000 $kg_f/mm^2$ (20 GPa). The method for determining Knoop Hardness is specified in ASTM C849, C1326 & E384.

According to the present invention it has been surprisingly found that a vitrified bonded abrasive composition comprising shaped abrasive particles as described herein and a bonding medium comprising a vitreous bond can provide bonded abrasive articles which are capable of accurately exhibiting a surface profile comprising surface features in dimensions which previous to the prior invention would not have been thought to be achievable by using the relative particle sizes as described herein. More specifically, it has been surprisingly found that the surface profile of a bonded abrasive article can comprise relatively small surface features despite the use of particle size dimensions which are larger as compared to the grain sizes that have been conventionally taught (i.e., conventionally taught particle sizes of at least about one order of magnitude smaller than the dimension of the surface feature to be (re)created within the surface profile).

According to the present invention, bonded abrasive articles can be provided which have on at least a part of their surface, typically their active surface, a surface profile comprising at least one surface feature wherein said shaped abrasive particles have a largest dimension of about the same order of magnitude or larger as compared to said surface profile feature. As used in the present invention with reference to all aspects of the present invention, the term "same order of magnitude" is to be seen in a rather broad sense as merely excluding such dissimilar dimensional differences taught prior to the present invention. Suitable dimensional differences in the present invention may encompass much smaller dimensional differences than previously thought to be required, including but not limited to dimensional differences of factors as small as 0.1 (or even smaller than 0.1), 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0 but also up to 4, 5, 6, 7, 8 or 9, depending on the intended grinding application. For example, in embodiments, suitable factors can range from about 0.1 to about 3, preferably 0.1 to about 2.5 or more preferably from about 0.1 to about 2.0. In other embodiments, suitable factors can range from more than about 2.5 to about 4 or to about 5, preferably from more than about 3 to about 4 or to about 5, and, in even further embodiments factors such as from more than 4 or 5 to about 9, such as from more than 4 or 5 to about 7 can be useful.

By way of explanation, a factor of 0.5 means that the largest dimension of said shaped abrasive particles is twice as large as the dimension of said surface feature under consideration. A factor of 1.0 means that the largest dimension of said shaped abrasive particles and the dimension of said surface feature has about the same size. A factor of 2 means that the largest dimension of said shaped abrasive particles has half the size of the dimension of said male surface feature.

As used in the present invention, the term "dimension" refers to a feature in terms of a length, i.e. a dimension which is attributed with a unit used to describe a longitudinal distance (illustrating example include but are not limited to a length, a height, a width, a radius), as opposed to for example an angle.

A dimension of a surface feature under consideration preferably relates to a male surface feature, as defined herein. Surface features (preferably of a male surface feature) for the purpose of size comparisons with the largest dimension of said shaped abrasive particles are not particularly limited and can be selected based on the intended grinding application and the desired final workpiece profile. Illustrating examples include but are not limited to the (maximum) width of a surface feature, the (maximum) height of the surface feature, or the depth of the surface profile and in particular a radius representing the sharpness of a surface feature, such as a corner radius R(corner) or a tip radius R(tip).

Due to the relative dimensions of surface features and particles according to the present invention a surface feature (typically a male surface feature) typically comprises a relatively limited number of individual shaped abrasive particles, whereas in conventional bonded abrasive articles, the sum of a huge number of individual particles having very fine particles sizes (as discussed) is comprised by a surface profile feature. According to the present invention, the number of individual particles can be determined based on methods of measurement which are generally well known and understood in the art, for example by providing a suitable image of a suitable cross-section (i.e., one which is representative for the surface profile and the surface feature under consideration, which is typically a male surface feature) and simply counting the particles constituting the surface feature (i.e. particle a major portion of which (i.e. more than about half of the particle) falls within the area represented by the surface feature). With respect to a shaped abrasive particle in the form of a triangular prism with sloping side walls (and a side wall draft angle 98 degrees) with two substantially parallel faces, wherein the first face comprises an equilateral triangle with a median dimension of 0.49 mm and the second face also comprises an equilateral triangle of median edge length of 0.415 mm and an average distance between the faces of 0.095 mm (i.e. particles designated as 80+ as used in Example I) a relatively limited number of individual particles comprised by a surface feature could, for example, mean any integral number selected from 1 to about 200 (particles), such as 1 to about 50, or 1 to about 20 or more typically 1 to about 15, without being limited to these examples.

Likewise, due to the relative dimensions of surface feature and shaped abrasive particles according to the present invention, it is surprisingly possible to provide bonded abrasive articles, wherein the height of a male surface feature has a dimension of about 0.1 to about 9 times the largest dimension of a shaped abrasive a particle, more typically of about 0.5 to about 4 and even more typically of about 0.5 to about 3 times the largest dimension of a shaped abrasive a particle.

Preferably the height of a male surface feature has about the same dimension as the largest dimension of said shaped abrasive particles, i.e. the height has a dimension of about 0.5 to about 1.5 times the largest dimensions of a shaped abrasive particle.

According to preferred embodiments of the present invention said male surface feature exhibits a tip radius R(tip) wherein said tip radius R(tip) and the largest dimension $L_{max}$ of said shaped abrasive particles are characterized by R(tip)≤2 $L_{max}$.

The effects underlying the present invention are completely contrary to the previous general understanding in the art that the (re)creation of a surface profile feature requires particle dimensions which are at least about one order of magnitude smaller than the dimension of the feature to be (re)created.

In a first aspect, the present invention provides a vitrified bonded abrasive composition for use of the preparation of a vitrified bonded abrasive article (in the following for short simply referred to as "the composition"). The composition comprises a plurality of shaped abrasive particles and a bonding medium comprising a vitreous bond.

Shaped abrasive particles for use in the present invention each comprise a first side and a second side separated by a thickness t, wherein said first side comprises a first face having a perimeter of a first geometric shape, wherein said thickness t is equal to or smaller than the length of the shortest side-related dimension of the particle.

The composition is suitable for use of the preparation of a bonded abrasive article, wherein said abrasive article exhibits at least on a part of its surface a surface profile comprising at least one surface feature wherein said shaped abrasive particles have a largest dimension of about the same order of magnitude or larger as compared to said surface feature. Said surface feature is typically a male surface feature. In preferred embodiments, said male surface feature exhibits a tip radius R(tip), and wherein said tip radius R(tip) and the largest dimension $L_{max}$ of said shaped abrasive particles are characterized by R(tip)≤2 $L_{max}$. More preferably, the tip radius R(tip) and the largest dimension $L_{max}$ of said shaped abrasive particles are characterized by R(tip)≤$L_{max}$ or more preferably by R(tip)≤0.8 $L_{max}$ or by R(tip)≤0.7 $L_{max}$ or by R(tip)≤0.6 $L_{max}$. Even more preferably, the tip radius R(tip) and the largest dimension $L_{max}$ of said shaped abrasive particles are characterized by R(tip)≤0.5 $L_{max}$ or R(tip)≤0.4 $L_{max}$. In most preferred cases, the tip radius R(tip) and the largest dimension $L_{max}$ of said shaped abrasive particles are characterized by R(tip)≤0.35 $L_{max}$.

Features of the composition are as described with respect to the bonded abrasive article. Hence, in preferred embodiments, the shaped abrasive particles, the bonding medium, the vitreous bond, the surface profile, the surface feature (preferably the at least one male surface feature), the height of a male surface feature, the tip radius R(tip), a corner radius R(corner) and said bonded abrasive article are as defined with respect to the second aspect of the invention (bonded abrasive article).

In a second aspect, the present invention provides a bonded abrasive article comprising a plurality of shaped abrasive particles and a bonding medium comprising a vitreous bond. The article exhibits at least on a part of its surface a surface profile comprising at least one surface feature wherein said shaped abrasive particles have a largest dimension of about the same order of magnitude or larger as compared to said surface feature. Said surface feature is preferably a male surface feature. In preferred embodiments, said male surface feature exhibits a tip radius R(tip), wherein said tip radius R(tip) is equal to or smaller than the largest dimension $L_{max}$ of said shaped abrasive particles.

The term profile is generally well understood in the art to refer to a more-or-less complex outline of a surface shape. The term "surface profile" as used in the present invention refers to the effective surface profile on at least a part of the active surface, i.e. on that part of the surface which is effective in imparting the final workpiece shape. The effective surface profile of the bonded abrasive article at least partially and preferably substantially corresponds to the final workpiece profile. The effective surface profile is typically substantially the same along the direction of the intended grinding motion, such as along the circumferential surface of a grinding wheel.

Mathematically, the actual surface profile of a bonded abrasive article can be imagined as a two-dimensional curve obtained by hypothetically intersecting a plane through the article to yield a cross-section representative for the active surface of the bonded abrasive article. By way of illustration, the surface profile of a bonded abrasive grinding wheel can be roughly imagined as the two-dimensional curve obtained by intersection of a plane through the axis of rotation (which in most cases corresponds to the wheel axis) and the active surface of the wheel, i.e., the circumferential surface of the wheel.

While in the most ideal and preferred case, the actual surface profile is the same at every possible site of intersection, in reality the actual surface profile might be slightly different from one possible site of cross-section to another possible site of cross-section, for example due to factors such as pores present in the surface.

The effective surface profile can be roughly imagined as the effective average of the sum of all possible hypothetical intersections within the above meaning in the sense of an intrinsic/enveloping curve to the actual surface profile (over the whole active surface area of the article). In other words, for the purposes of dimensions of surface profile features, factors that might result in the actual surface profile being different from the effective surface profile (for example pores present in the surface) are typically not taken into account.

The surface profile comprises at least one surface feature wherein said shaped abrasive particles have a largest dimension of about the same order of magnitude or larger as compared to said surface feature.

As used herein the term "surface feature" relates to a shape feature comprised by the surface profile of the bonded abrasive article. A male surface feature is a feature which protrudes relative to the environment of said feature. A female surface feature is a feature which is depressed relative to the environment of said feature. From a mathematical perspective, a male surface feature refers to a part of the profile which includes a maximum and a female surface feature refers to a part of the profile which includes a minimum. Typically, a surface feature comprised by the surface profile of the bonded abrasive article has a corresponding (typically complementary) counterpart surface feature in the final workpiece profile. For example, a male surface feature comprised by the surface profile has typically a corresponding female counterpart in the final workpiece profile.

Surface features (preferably, male surface features) for the purpose of size comparison with the largest dimension of the shaped abrasive particles are not particularly limited and can be selected for example based on the grinding application and the intended final workpiece profile. Illustrating examples of surface features include but are not limited to the (maximum) width of a surface feature, the (maximum) height (or depth) of a surface feature, a corner radius or a tip radius R(tip), with preferred illustrating examples being selected from a corner radius, a tip radius and a combination of one or more corner radii and a tip radius.

The height of a surface feature can be easily established based on the outline of the profile. Typically, the height is the distance between the maximum comprised by a male surface feature and the base line, which can be a line connecting two adjacent minima. In typical cases, the height of a male surface feature can correspond to the depth of surface profile.

The width of a surface feature can also easily be established based on the outline of the profile. Typically, the width of a surface feature is the maximum distance of a surface feature for example at a hypothetical base line of a surface feature.

A corner radius relates to the smallest radius of curvature which can be fit into a part of a surface feature comprising a corner. While the tip region comprises the maximum of a surface feature, a corner region as used herein is intended to refer to any region other than a tip region that comprises one corner. Hence, corner regions are typically located in the flanks of a surface feature. Illustrating examples of corner regions are shown for example in Forms 39, 39E, B, C or M of FIG. 3. A corner radius can be present in addition or instead of a tip radius. Examples of profiles that can include a tip radius in addition to one or more corner radii include but are not limited to step profiles. A corner radius R(corner) in a surface profile of a bonded abrasive article typically has a corresponding complementary corner radius R(corner)' in the final workpiece profile.

In typical cases the surface profile can be selected from patterns including but not limited to a ridge, a pattern of ridges and valleys, a triangular peak, a triangular curve, a sinusoidal curve, and others known in the art.

A male surface feature generally comprises two flanks (sides) enclosing a tip region of the male surface feature. The tip region typically comprises the maximum of the male surface feature. The tip region is intended to broadly refer to that surface profile part of the male surface feature joining the two sides or flanks and is not intended to be limited to any particular profile shape of that region. Hence a tip region can equally comprise surface features which are more round or flat as well as surface feature which are more pointed as long as the dimensional relations according to the present invention are met and more preferably as long as such features can be characterized by a tip radius according to the present invention.

The nature of the flanks is not particularly limited. For example, the two flanks can be identical or be different. Also, the two flanks can be symmetrical to each other with respect to a longitudinal axis of the male surface feature (as defined herein) or they can have a shape which does not result in any kind of symmetry between the two flanks.

For example, the two flanks can be substantially straight lines in which case the top region would comprise the part beginning where the substantially straight lines convert to a curve including the maximum of a male surface feature.

The two flanks can be declined against each other so as to include an angle E, although this is not a necessary requirement. In other embodiments the two flanks can be substantially parallel to each other (this is defined herein to correspond to an angle ε° of about 0°). Principally, the angle ε is not limited as long as it gives rise to a geometry which is useful for the intended grinding application. In typical cases, the angle ε is selected to be smaller than about 100°, more typically to be smaller than about 85° or even more typically about 90° C. or less. In preferred cases, the angle ε is selected to range from about 28 to about 82°, more preferably from about 33° to about 65° and even more preferably from about 55° to about 63°. However, these ranges are not to be understood as limiting since in even other preferred embodiments, the angle ε can for example be selected to range from about 25° to about 45°. In even other embodiments, it might be desirable to have an angle which substantially corresponds to (and preferably is equal to) 29°, 30°, 35°, 45°, 55°, 60°, 80° or 90°.

The angle ε typically corresponds to an angle ε' in the final workpiece profile, with examples including but not being limited to the angle of thread (angle between adjacent flanks of a thread), or the angle between adjacent flanks of a gear.

Exemplary male surface features are shown in FIG. 3. With respect to the illustrating drawings shown in FIG. 3, it is to be understood that the schemes are not to scale and that the variables represented by V, W, R, U, X, and J may take any value which is in accordance with the dimensional requirements according to the present invention, such as the preferred dimensional relations with respect to the tip radius, a corner radius or the height of a surface feature.

According to preferred illustrating examples a male surface feature is selected from male surface features according to any standard wheel faces according to DIN ISO 525:2000, such as standard wheel faces B, C, D, E, F, M, N, P shown in FIG. 3. With respect to FIG. 3, a wheel of Form 1E would mean a wheel of standard form 1 comprising a male surface feature according to wheel face E, or a wheel of Form 39E would mean a wheel of standard form 39 comprising a male surface feature according to wheel face E. According to the present invention, suitable male surface features also include non-standard type face forms.

The term "tip radius", or "R(tip)" as used herein generally refers to the smallest radius of a curvature which can be fit into the tip region, i.e. that surface profile part comprising the maximum of the male surface feature.

The tip radius R(tip) typically corresponds to a root radius R(root) in the final workpiece profile, such as a root radius of a thread or of a gear. The term root radius is however not limited to these exemplary workpieces but is intended to refer to any kind of workpiece profiles (in terms of both final workpiece profile and workpiece material) which can be imparted in accordance with the present invention.

The tip radius R(tip) and the largest dimension $L_{max}$ of said shaped abrasive particles are preferably characterized by R(tip)≤2 $L_{max}$. More preferably, the effective tip radius $R_e$(tip) and the largest dimension $L_{max}$ of said shaped abrasive particles are characterized by R(tip)≤$L_{max}$ or more preferably by R(tip)≤0.8 $L_{max}$ or by R(tip)≤0.7 $L_{max}$ or by R(tip)≤0.6 $L_{max}$. Even more preferably, the tip radius R(tip) and the largest dimension $L_{max}$ of said shaped abrasive particles are characterized by R(tip)≤0.5 $L_{max}$ or R(tip)≤0.4 $L_{max}$. In most preferred cases, the tip radius R(tip) and the largest dimension $L_{max}$ of said shaped abrasive particles are characterized by R(tip)≤0.35 $L_{max}$.

The tip radius can have any suitable absolute dimensions, with preferred absolute dimensions ranging from about 0.01 mm to about 6.00 mm, preferably from about 0.05 mm to about 3.00 mm.

In other preferred embodiments, the surface profile of the bonded abrasive article comprises at least one surface feature (typically a male surface feature) exhibiting a corner radius R(corner). The corner radius R(corner) and the largest dimension $L_{max}$ of said shaped abrasive particles are preferably also characterized by R(corner)≤2 $L_{max}$. More preferably, the corner radius R(corner) and the largest dimension $L_{max}$ of said shaped abrasive particles are characterized by R(corner)≤$L_{max}$ or more preferably by R(corner)≤0.8 $L_{max}$ or by R(corner)≤0.7 $L_{max}$ or by R(corner) $L_{max}$. Even more preferably, the corner radius R(corner) and the largest dimension $L_{max}$ of said shaped abrasive particles are characterized by R(corner)≤0.5 $L_{max}$ or R(corner)≤0.4 $L_{max}$. In most preferred cases, the corner radius R(corner) and the largest dimension $L_{max}$ of said shaped abrasive particles are characterized by R(corner)≤0.35 $L_{max}$.

A surface feature can exhibit one or more corner radii in addition to a tip radius or instead of a tip radius. A corner radius can have any suitable absolute dimensions, with preferred absolute dimensions ranging from about 0.01 mm to about 6.00 mm, preferably from about 0.05 mm to about 3.00 mm.

According to preferred embodiments of the present invention, said surface profile (comprised by at least a part of the surface of the bonded abrasive article) has been at least partially imparted by dressing. Dressing can be carried out as is known in the art, for example, by using a dressing tool having a hardness higher than the bonded abrasive article. Typically, dressing tools are made of superhard materials (i.e. materials having a hardness of more than 3500 kg/mm² according to ASTM C849, C1326 & E384), such as diamond and can comprise fixed dressing tools such as single point diamond dressers, Diaform™ fixed dressing tools, multi-point diamond dressers, diamond blade tools and MCD dressing blades or rotary dressing tools such as form dressing rolls, PCD form dressing rolls, diamond dressing disks, diamond profile rolls, diamond radius dressing rolls and others. Rotary dressing can also be carried out by crush dressing using crushing rolls made of steel such as hardened tool steel or high speed steel, or hard metal such as tungsten carbide, or others.

While not wishing to be bound by any particular theory, it is believed that shaped abrasive particles as used in the present invention are not as easily pulled from the bond upon dressing as abrasive particles conventionally used, such as crushed particles having a distribution of irregular shapes and sizes. As a result, the particles themselves are believed to be able to participate in the dressing process. To the contrary, particles which are pulled out of the bond during dressing cannot be dressed themselves and in addition will leave empty space at the site of their original location.

Particles participating in the dressing process are typically characterized in that they have at least one surface at least a part of which is dressed. A dressed surface conforms to parts of the surface profile which are adjacent to the site comprising the dressed particle. In other words, the dressed surface part of the abrasive particle forms a part of the surface profile of the bonded abrasive article. The dressed surface part can thereby contribute to the precision of the surface profile of the bonded abrasive article. Preferably, the bonded abrasive article thus further comprises modified shaped abrasive particles having a modified shape, wherein said modified shape is derivable from the original shape of said shaped abrasive particles by dressing. The modified shape is characterized by comprising on at least a part of its surface a surface part which is dressed. The dressed surface part of the abrasive particle preferably forms a part of the surface profile of the bonded abrasive article. Preferably, the dressed surface part contributes to the precision of the surface profile of the bonded abrasive article. Even more preferably, the dressed surface part contributes to the precision of one or more surface features (for example one or more surface features selected from a width, height, corner radius and tip radius), and in particular to the precision of any tip and/or corner regions of a male surface feature.

Hence, preferably, at least some and more preferably a major part and even more preferably substantially all of said modified shaped abrasive particles contribute to the precision of said surface feature.

Preferably, said contributing modified shaped abrasive particles are located at or near the tip region and/or one or more corner region(s) of a male surface feature.

The particular shape of the at least one male surface feature is not limited. The shape can be selected based on the desired grinding application and the intended final workpiece profile. Typically, a male surface feature comprised in the surface profile of the bonded abrasive article corresponds to a female surface feature in the final workpiece profile.

In typical cases, a male surface feature may have a longitudinal axis (although this is not a necessary requirement). A "longitudinal axis" is understood as an axis extending from a thought base line that can be drawn to the male surface feature and through the tip region (i.e. the region around the maximum of the male surface feature).

The shape of said male surface feature may be symmetrical to said longitudinal axis. In other embodiments the shape of said male surface feature may not be symmetrical to said longitudinal axis.

Examples of typical male surface features include but are not limited to a ridge, a tip, a corner, an edge, and other male surface profile elements.

The profile can comprise a single male surface feature (such as in the case of a single rib grinding wheel). However, in other cases, the profile can comprise a plurality selected from two, three, four, five, six, seven, eight, nine, ten or even more (for example up to 350) of said male surface features (for example in the case of a multi-rib grinding wheel).

When the surface profile comprises a plurality of male surface features, said features may be either identical or different to each other. For example, the plurality may comprise a first plurality of a first male surface feature and a second plurality of a second plurality, wherein the surface features comprised by the first plurality are different to the ones comprised by the second plurality.

The shaped abrasive particles for use in all aspects of the present invention can be described as follows:

Three basic technologies that have been employed to produce abrasive grains having a specified shape are (1) fusion, (2) sintering, and (3) chemical ceramic. Any one of these basic technologies or any combination of two or all of these technologies may be used in order to provide shaped abrasive particles for use in the present invention.

The materials that can be made into shaped abrasive particles of the invention include any suitable hard or superhard material known to be suitable for use as an abrasive particle.

Accordingly, in one embodiment, the shaped abrasive particles comprise a hard abrasive material. In another embodiment, the shaped abrasive particles comprise a superhard abrasive material. In yet other embodiments, the shaped abrasive particles comprise a combination of hard and superhard materials.

Specific examples of suitable abrasive materials include known ceramic materials, carbides, nitrides and other hard and superhard materials such as aluminum oxide (for example alpha alumina) materials (including fused, heat treated, ceramic and sintered aluminum oxide materials), silicon carbide, titanium diboride, titanium nitride, boron carbide, tungsten carbide, titanium carbide, diamond, cubic boron nitride (CBN), garnet, alumina-zirconia, sol-gel derived abrasive particles, cerium oxide, zirconium oxide, titanium oxide or a combination thereof.

The most useful of the above are typically based on aluminum oxide, and in the specific descriptions that follow the invention may be illustrated with specific reference to aluminum oxide. It is to be understood, however, that the invention is not limited to aluminum oxide but is capable of being adapted for use with a plurality of different hard and superhard materials.

With respect to the three basic technologies for preparing shaped abrasive particles (i.e., fusion, sintering and chemical ceramic technologies), in the present invention, the shaped abrasive particles may be based on one or more materials) prepared by any one of these technologies, i.e. on one or more fused, sintered or ceramic materials, with a preferred material being aluminum oxide (preferably alpha aluminum oxide). In other words, preferred shaped abrasive particles according to the invention are based on alumina, i.e. such particles either consist of alumina or are comprised of a major portion thereof, such as for example greater than 50%, for example 55 to 100%, or 60 to 80%, more preferably 85 to 100% by weight of the total weight of the abrasive particle. The remaining portion may comprise any material which will not detract from the shaped abrasive particle acting as an abrasive, including but not limited to hard and superhard materials as outlined in the foregoing. In some preferred embodiments, the shaped abrasive particles consist of 100% aluminum oxide. In yet other preferred embodiments, the shaped abrasive particles comprise at least 60% by weight aluminum oxide or at least 70% by weight of aluminum oxide. Useful shaped abrasive particles may, for example, include but are not limited to particles which comprise a major portion (for example 50% or more and preferably 55% or more by weight) of fused aluminum oxide and a minor portion (for example, less than 50% and preferably less than 45% by weight) of an abrasive material different from fused aluminum oxide (for example zirconium oxide).

It is also within the scope of the present invention to use abrasive particles wherein at least a part of the shaped abrasive particles comprises a surface coating on at least a part their surface. A surface coating may for example comprise inorganic particles. Surface coatings on the shaped abrasive particles may be used to improve the adhesion between the shaped abrasive particles and a binder material in abrasive articles, or can be used to aid in electrostatic deposition of the shaped abrasive particles. In one embodiment, surface coatings as described in U.S. Pat. No. 5,352,254 (Celikkaya) in an amount of 0.1 to 2 percent surface coating to shaped abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent the shaped abrasive particle from capping. Capping is the term to describe the phenomenon where metal particles from the workpiece being abraded become welded to the tops of the shaped abrasive particles. Surface coatings to perform the above functions are known to those skilled in the art.

In the present invention, it is preferred to use shaped abrasive particles produced by chemical ceramic technology, i.e., ceramic shaped abrasive particles. However, the present invention is not limited to the use of such particles.

In one embodiment, the ceramic shaped abrasive particles comprise alpha alumina, i.e. the particles are alpha alumina based ceramic shaped particles.

In one embodiment, the ceramic shaped abrasive particles comprise sol-gel derived alumina based abrasive particles. Both seeded and non-seeded sol-gel derived alumina based abrasive particles can be suitably used in accordance with the present invention. However, in some instances, it may be preferred to use non-seeded sol-gel derived alumina based abrasive particles.

The shaped abrasive particles of the present invention each have a substantially precisely formed three-dimensional shape. Typically, the shaped abrasive particles generally have a predetermined geometric shape, for example one that substantially replicates the mold cavity that was used to form the shaped abrasive particle.

Preferably, the shaped abrasive particles can be characterized as thin bodies. As used herein the term thin bodies is used in order to distinguish from elongated or filamentary particles (such as rods), wherein one particle dimension (length, longest particle dimension) is substantially greater than each of the other two particle dimensions (width and thickness) as opposed to particle shapes useful in the present invention wherein the three particle dimensions (length, width and thickness as defined herein) are either of the same order of magnitude or two particle dimensions (length and width) are substantially greater than the remaining particle dimension (thickness). Conventional filamentary abrasive particles can be characterized by an aspect ratio, that is the ratio of the length (longest particle dimension) to the greatest cross-sectional dimension (the greatest cross-sectional dimension perpendicular to the length) of from about 1:1 to about 50:1, preferably of from about 2:1 to about 50:1 and more typically greater than about 5:1 to about 25:1. Furthermore, such conventional filamentary abrasive particles are characterized by a cross-sectional shape (the shape of a cross section taken perpendicular to the length or longest dimension of the particle) which does not vary along the length.

In contrast hereto, shaped abrasive particles according to the present invention can be typically characterized by a cross-sectional shape that varies along the length of the particle. Variations can be based on size of the cross-sectional shape or on the form of the cross-sectional shape.

The abrasive particles generally each comprise a first side and a second side separated by a thickness t. The first side generally comprises (and more typically is) a first face (in typical cases a planar face) having a perimeter of a first geometric shape.

Preferably, the thickness t is equal to or smaller than the length of the shortest side-related dimension of the particle (the shortest dimension of the first side and the second side of the particle; the length of the shortest side-related dimension of the particle may also be referred to herein as the length of the shortest facial dimension of the particle).

In typical cases, the second side comprises a vertex separated from the first side by thickness t, or the second side comprises a ridge line separated from the first side by thickness t, or the second side comprises a second face separated from the first side by thickness t. For example, the second side may comprise a vertex and at least one sidewall connecting the vertex and the perimeter of the first face (illustrative examples include pyramidal shaped particles, for example tetrahedral-shaped particles). Alternatively, the second side may comprise a ridge line and at least one sidewall connecting the ridge line and the perimeter of the first face (illustrative examples include roof-shaped particles). Alternatively, the second side may comprise a second face and at least one sidewall (which may be a sloping sidewall) connecting the second face and the first face (illustrative examples include triangular prisms or truncated pyramids).

Blends of different shaped abrasive particles in accordance with the present invention can be used in the bonded abrasive articles of the present invention. A blend of shaped abrasive particles can comprise a first plurality of shaped abrasive particles in accordance with the present invention and a second plurality of shaped abrasive particles in accordance with the present invention wherein the particles of the first plurality are different from the second plurality. Differences can for example be selected based on the shape or grade or chemical composition of the abrasive particle.

The thickness t may be the same (for example in embodiments wherein the first and second sides comprise parallel planar faces) or vary over the planar configuration of the particle (for example in embodiments wherein one or both of the first and second sides comprise non-planar faces or in embodiments wherein the second side comprises a vertex or a ridge line as discussed in more detail later herein).

In most cases, the ratio of the length of the shortest side-related dimension of the shaped abrasive particle to the thickness of the shaped abrasive particle is at least 1:1 but can range from 1:1 to 10:1, more preferably from 2:1 to 8:1 and most preferably from 3:1 to 6:1. This ratio is also referred to herein as primary aspect ratio.

The dimension of the thickness of the particles is not particularly limited. For example in typical cases, the thickness can be about 5 micrometers or more, or about 10 micrometers or more, or about 25 micrometers or more, or about 30 micrometers or more, or even about 200 micrometers or more. The upper limit of the thickness can be selected to be about 4 mm or less, or about 3 mm or less for large particles, or about 1600 micrometers or less, or about 1200 micrometers or less, or about 100 micrometers or less, or about 500 micrometers or less or about 300 micrometers or less or even about 200 micrometers or less.

The shaped abrasive particles are typically selected to have a length in a range of from 0.001 mm to 26 mm, more typically 0.1 mm to 10 mm, and more typically 0.5 mm to 5 mm, although other lengths may also be used. In some embodiments, the length may be expressed as a fraction of the thickness of the bonded abrasive article in which it is contained. For example, the shaped abrasive particle may have a length greater than half the thickness of the bonded abrasive wheel. In some embodiments, the length may be greater than the thickness of the bonded abrasive wheel.

The shaped abrasive particles are typically selected to have a width in a range of from 0.001 mm to 26 mm, more typically 0.1 mm to 10 mm, and more typically 0.5 mm to 5 mm, although other dimensions may also be used.

In preferred embodiments, the largest dimension (or length) of said shaped abrasive particles is selected from the range of from about 50 to 2650 µm, and more typically from a range of from about 100 µm to about 1400 µm.

The shaped abrasive particles can have various volumetric aspect ratios. The volumetric aspect ratio is defined as the ratio of the maximum cross sectional area passing through the centroid of a volume divided by the minimum cross sectional area passing through the centroid.

For some shapes, the maximum or minimum cross sectional area may be a plane tipped, angled, or tilted with respect to the external geometry of the shape. For example, a sphere would have a volumetric aspect ratio of 1.000 while a cube will have a volumetric aspect ratio of 1.414. A shaped abrasive particle in the form of an equilateral triangle having each side equal to length A and a uniform thickness equal to A will have a volumetric aspect ratio of 1.54, and if the uniform thickness is reduced to 0.25 A, the volumetric aspect ratio is increased to 2.64. It is believed that shaped abrasive particles having a larger volumetric aspect ratio have enhanced cutting performance.

In various embodiments of the invention, the volumetric aspect ratio for the shaped abrasive particles can be greater than about 1.15, or greater than about 1.50, or greater than about 2.0, or between about 1.15 to about 10.0, or between about 1.20 to about 5.0, or between about 1.30 to about 3.0.

The abrasive particles are preferably in the shape of thin three-dimensional bodies having various three-dimensional shapes. Typical examples include particles (typically but not absolutely necessarily, thin bodies) in the form of flat triangles, flat rectangles, flat triangles which have at least one face and more preferably two faces that is/are shaped inwardly (for example recessed or concave), as discussed in more detail later herein.

The first side generally comprises (and more typically is) a first face having a perimeter of a first geometric shape.

For example, the first geometric shape can be selected from geometric shapes having at least one vertex, more typically two or more, preferably three or more, most preferably three or four vertices.

Suitable examples for geometric shapes having at least one vertex include polygons (including equilateral, equiangular, star-shaped, regular and irregular polygons), lens-shapes, lune-shapes, circular shapes, semicircular shapes, oval shapes, circular sectors, circular segments, drop-shapes and hypocycloids (for example super elliptical shapes). Preferred examples are selected from polygons.

Specific examples for suitable polygonal geometric shapes include triangular shapes and quadrilateral shapes (for example a square, a rectangle, a rhombus, a rhomboid, a trapezoid, a kite, or a superellipse).

The vertices of suitable quadrilateral shapes can be further classified as a pair of opposing major vertices that are intersected by a longitudinal axis and a pair of opposing minor vertices located on opposite sides of the longitudinal axis. Shaped abrasive particles having a first side having this type of quadrilateral shape can be characterized by an aspect ratio of a maximum length along a longitudinal axis divided by the maximum width transverse to the longitudinal axis of 1.3 or greater, preferably 1.7 to about 5. This aspect ratio is also referred to herein as secondary aspect ratio.

In some embodiments it is particularly preferred that the first geometric shape is selected from triangular shapes, such as an isosceles triangular shape or, more preferably, an equilateral triangular shape.

In other embodiments, the first geometric shape is selected from quadrilateral shapes, preferably from the group of a square, a rectangle, a rhombus, a rhomboid, a trapezoid, a kite, or a superellipse, more preferably from the group of a rectangle, a rhombus, a rhomboid, a kite or a superellipse.

For the purposes of this invention geometric shapes are also intended to include regular or irregular polygons or stars wherein one or more edges (parts of the perimeter of the face) can be arcuate (either of towards the inside or towards the outside, with the first alternative being preferred). Hence, for the purposes of this invention, triangular shapes also include three-sided polygons wherein one or more of the edges (parts of the perimeter of the face) can be arcuate, i.e., the definition of triangular extends to spherical triangles and the definition of quadrilaterals extends to superellipses.

The second side may comprise (and preferably is) a second face. The second face may have a perimeter of a second geometric shape.

The second geometric shape may be the same or be different to the first geometric shape. Preferably the second geometric shape is selected to have substantially the same shape as the first geometric shape and is preferably arranged in a congruent way with the first geometric shape (although the size or area of the geometric shapes may be different, i.e. the one face may be larger than the other one).

In other words, as used herein the terms "substantially the same shape" or "substantially identical shapes" are intended to include the case wherein the area encompassed by said shapes may be different in size.

As used herein with respect to the preferred case of substantially identical first and second geometric shapes, the term "arranged in a congruent way with the first geometric shape" is intended to include the case wherein the first and the second geometric shapes are slightly rotated against each other, although it is preferred that said substantially identical first and second geometric shapes are perfectly aligned or only slightly rotated against each other. The degree (or angle of rotation) depends on the particular geometric shape of the first face and of the second face and the thickness of the particle. Acceptable angles of rotation may range from 0 to +/±30 degrees, preferably from 0 to +/±15, more preferably from 0 to +/±10 degrees. Most preferably, the angle of rotation is about 0 degrees (for example 0+/−5 degrees).

Examples of suitable geometric shapes of the perimeter of the second face include shapes as exemplified in the foregoing with respect to the first geometric shapes.

It is particularly preferred that the first and preferably also the second geometric shape is selected from triangular shapes, such as an isosceles triangular shape or, more preferably, an equilateral triangular shape.

The first face may be substantially planar or the second face (if present) may be substantially planar. Also, both faces may be substantially planar. In many typical cases, the first face is planar (and identical to the first side).

Alternatively, at least one of the first and the second face (if present) may be a non-planar face. Also both faces may be non-planar faces.

For example, one or both of the first and the second face (if present) could be shaped inwardly (for example recessed or concave) or could be shaped outwardly (for example convex).

For example, the first face (or the second face, if present) can be shaped inwardly (for example be recessed or concave) and the second face (if present, or the first face) can be substantially planar. Alternatively, the first face (or the second face, if present) can be shaped outwardly (for example be convex) and the second face (if present, or the first face) can be shaped inwardly (for example be recessed or concave), or, the first face can be shaped inwardly (for example be recessed or concave) and the second face (if present) can also be shaped inwardly (for example be recessed or concave).

The first face and the second face (if present) can be substantially parallel to each other. Alternatively, the first face and the second face (if present) can be nonparallel, for example such that imaginary lines tangent to each face would intersect at a point (as in the exemplary case wherein one face is sloped with respect to the other face).

The second face is typically connected to the perimeter of the first face by at least one sidewall which may be a sloping sidewall, as will be discussed later in more detail. The sidewall may comprise one or more facets, which are typically selected from quadrilateral facets.

Specific examples of shaped particles having a second face include prisms (for example triangular prisms) and truncated pyramids.

In some embodiments, the second side comprises a second face and four facets that form a sidewall (draft angle alpha between the sidewall and the second face equals 90 degrees) or a sloping sidewall (draft angle alpha between the sidewall and the second face greater than 90 degrees). As the thickness, t, of the shaped abrasive particle having a sloping sidewall becomes greater, the shaped abrasive particle resembles a truncated pyramid when the draft angle alpha is greater than 90 degrees.

The shaped abrasive particles can comprise at least one sidewall, which may be a sloping sidewall. Typically, the first face and the second face are connected to each other by the at least one sidewall.

In other embodiments the ridge line and the first face are connected to each other by the at least one sidewall.

In even other embodiments, the vertex and the first face are connected to each other by the at least one sidewall.

In some embodiments, more than one (for example two or three) sloping sidewall can be present and the slope or angle for each sloping sidewall may be the same or different. In some embodiments, the first face and the second face are connected to each other by a sidewall. In other embodiments, the sidewall can be minimized for particles where the faces taper to a thin edge or point where they meet instead of having a sidewall.

The sidewall can vary and it generally forms the perimeter of the first face and the second face (if present). In case of a sloping sidewall, it forms a perimeter of the first face and a perimeter of the second face (if present). In one embodiment, the perimeter of the first face and the second face is selected to be a geometric shape (preferably a triangular shape), and the first face and the second face are selected to have the same geometric shape, although, they may differ in size with one face being larger than the other face.

A draft angle alpha between the second face and the sloping sidewall of the shaped abrasive particle can be varied to change the relative sizes of each face. In various embodiments of the invention, the area or size of the first face and the area or size of the second face are substantially equal. In other embodiments of the invention, the first face or second face can be smaller than the other face.

In one embodiment of the invention, draft angle alpha can be approximately 90 degrees such that the area of both faces is substantially equal. In another embodiment of the invention, draft angle alpha can be greater than 90 degrees such that the area of the first face is greater than the area of the second face. In another embodiment of the invention, draft angle alpha can be less than 90 degrees such that the area of the first face is less than the area of the second face. In various embodiments of the invention, the draft angle alpha can be between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees.

The first face and the second face can also be connected to each other by at least a first sloping sidewall having a first draft angle and by a second sloping sidewall having a second draft angle, which is selected to be a different value from the first draft angle. In addition, the first and second faces may also be connected by a third sloping sidewall having a third draft angle, which is a different value from either of the other two draft angles. In one embodiment, the first, second and third draft angles are all different values from each other. For example, the first draft angle could be 120 degrees, the second draft angle could be 110 degrees, and the third draft angle could be 100 degrees.

Similar to the case of an abrasive particle having one sloping sidewall, the first, second, and third sloping sidewalls of the shaped abrasive particle with a sloping sidewall can vary and they generally form the perimeter of the first face and the second face.

In general, the first, second, and third, draft angles between the second face and the respective sloping sidewall of the shaped abrasive particle can be varied with at least two of the draft angles being different values, and desirably all three being different values. In various embodiments of the invention, the first draft angle, the second draft angle, and the third draft angle can be between about 95 degrees to about 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees.

The sloping sidewall can also be defined by a radius, R, instead of the draft angle alpha (as illustrated in FIG. 5B of US Patent Application No. 2010/0151196). The radius, R, can be varied for each of the sidewalls.

Additionally, the various sloping sidewalls of the shaped abrasive particles can have the same draft angle or different draft angles. Furthermore, a draft angle of 90 degrees can be used on one or more sidewalls. However, if a shaped abrasive particle with a sloping sidewall is desired, at least one of the sidewalls is a sloping sidewall having a draft angle of about greater than 90 degrees, preferably 95 degrees or greater.

The sidewall can be precisely shaped and can be for example either concave or convex. Alternatively, the sidewall (top surface) can be uniformly planar. By uniformly planar it is meant that the sidewall does not have areas that are convex from one face to the other face, or areas that are concave from one face to the other face. For example, at least 50%, or at least 75%, or at least 85% or more of the sidewall surface can be planar. The uniformly planar sidewall provides better defined (sharper) edges where the sidewall intersects with the first face and the second face, and this is also thought to enhance grinding performance.

The sidewall may also comprise one or more facets, which are typically selected from triangular and quadrilateral facets or a combination of triangular and quadrilateral facets.

The angle beta between the first side and the sidewall can be between 20 degrees to about 50 degrees, or between about 10 degrees to about 60 degrees, or between about 5 degrees to about 65 degrees.

The second side may comprise a ridge line. The ridge line is typically connected to the perimeter of the first face by at least one sidewall which may be a sloping sidewall, as discussed in the foregoing. The sidewall may comprise one or more facets, which are typically selected from triangular and quadrilateral facets or a combination of triangular and quadrilateral facets.

The ridge line may be substantially parallel to the first side. Alternatively, the ridge line may be non-parallel to the first side, for example such that an imaginary line tangent to the ridge line would intersect the first side at a point (as in the exemplary case wherein the ridge line is sloped with respect to the first face).

The ridge line may be straight lined or may be non-straight lined, as in the exemplary case wherein the ridge line comprises arcuate structures.

The facets may be planar or non-planar. For example at least one of the facets may be non-planar, such as concave or convex. In some embodiments, all of the facets can be non-planar facets, for example concave facets.

Specific examples of shaped particles having a ridge line include roof-shaped particles, for example particles as illustrated in FIG. 4A to 4C of WO 2011/068714). Preferred roof-shaped particles include particles having the shape of a hip roof, or hipped roof (a type of roof wherein any sidewalls facets present slope downwards from the ridge line to the first side. A hipped roof typically does not comprise vertical sidewall(s) or facet(s)).

In some embodiments, the first geometric shape is selected from a quadrilateral having four edges and four vertices (for example from the group consisting of a rhombus, a rhomboid, a kite, or a superellipse) and the second side comprises a ridge line and four facets forming a structure similar to a hip roof. Thus, two opposing facets will have a triangular shape and two opposing facets will have a trapezoidal shape.

The second side may comprise a vertex and at least one sidewall connecting the vertex and the perimeter of the first face. The at least one sidewall may be a sloping sidewall, as discussed in the foregoing. The sidewall may comprise one or more facets, which are typically selected from triangular facets. The facets may be planar or non-planar. For example at least one of the facets may non-planar, such as concave or convex. In some embodiments, all of the facets can be non-planar facets, for example concave facets.

Illustrative examples include pyramidal-shaped particles, for example tetrahedral-shaped particles or particles as illustrated in FIG. 1A to 1C and FIG. 2A to 2C of WO 2011/068714.

The thickness, t, of the shaped abrasive particles can be controlled to select an angle, beta, between the first side and the sidewall (or facets). In various embodiments of the invention, the angle beta between the first side and the sidewall (or facets) can be between 20 degrees to about 50 degrees, or between about 10 degrees to about 60 degrees, or between about 5 degrees to about 65 degrees.

In typical embodiments the second side comprises a vertex and a sidewall comprising and more typically consisting of triangular facets forming a pyramid. The number of facets comprised by the sidewall will depend on the number of edges present in the first geometric shape (defining the perimeter of the first face). For example, pyramidal shaped abrasive particles having a first side characterized by a trilateral first geometric shape will generally have three triangular facets meeting in the vertex thereby forming a pyramid, and pyramidal shaped abrasive particles having a first side characterized by a quadrilateral first geometric shape will generally have four triangular facets meeting in the vertex thereby forming a pyramid, and so on.

In some embodiments, the second side comprises a vertex and four facets forming a pyramid. In exemplary embodiments, the first side of the shaped abrasive particle comprises a quadrilateral first face having four edges and four vertices with the quadrilateral preferably being selected from the group consisting of a rhombus, a rhomboid, a kite, or a superellipse. The shape of the perimeter of the first face (i.e., the first geometric shape) can be preferably selected from the above groups since these shapes will result in a shaped abrasive particle with opposing major vertices along the longitudinal axis and in a shape that tapers from the transverse axis toward each opposing major vertex.

The degree of taper can be controlled by selecting a specific aspect ratio for the particle as defined by the maximum length, L, along the longitudinal axis divided by the maximum width, W, along the transverse axis that is perpendicular to the longitudinal axis. This aspect ratio (also referred to herein as "secondary aspect ratio") should be greater than 1.0 for the shaped abrasive particle to taper as may be desirable in some applications. In various embodiments of the invention, the secondary aspect ratio is between about 1.3 to about 10, or between about 1.5 to about 8, or between about 1.7 to about 5. As the secondary aspect ratio becomes too large, the shaped abrasive particle can become too fragile.

In some embodiments, it is possible to slightly truncate one or more of the vertices as shown by dashed lines 42 in FIG. 1 of WO 2011/068714 and mold the shaped abrasive particles into such a configuration. In these embodiments, if the edges where the truncation occurs can be extended to form one or more an imaginary vertices that then completes the claimed quadrilateral, the first side is considered to be the claimed shape. For example, if both of the major opposing vertices were truncated, the resulting shape would still be considered to be a rhombus because when the edges are extended past the truncation they form two imaginary vertices thereby completing the rhombus shape for the first side.

Another exemplary class of shaped abrasive particles having a second side comprising a vertex are tetrahedral shaped particles. A tetrahedral shape generally comprises four major sides joined by six common edges, wherein one of the four major sides contacts three other of the four major sides, and wherein the six common edges have substantially the same length. According to the definitions used herein a tetrahedral shape can be characterized by a first side comprising a equilateral triangle as a first face and a second side comprising a vertex and a sidewall comprising three equilateral triangles as facets connecting the first face and the vertex, thereby forming a tetrahedron.

At least one of the four major sides (i.e. the group consisting of the first side and the three facets) can be substantially planar. At least one of the four major sides can be concave, or all the four major sides can be concave. At least one of the four major sides can be convex or all the four major sides can be convex.

The shaped particles of this embodiment typically have tetrahedral symmetry. The shaped abrasive particles of this embodiment are preferably substantially shaped as regular tetrahedrons.

It is preferred that the shaped abrasive particles comprise at least one shape feature selected from: an opening (preferably one extending or passing through the first and second side); at least one recessed (or concave) face or facet; at least one face or facet which is shaped outwardly (or convex); at least one side comprising a plurality of grooves; at least one fractured surface; a low roundness factor (as described later herein); a perimeter of the first face comprising one or more corner points having a sharp tip; a second side comprising a second face having a perimeter comprising one or more corner points having a sharp tip; or a combination of one or more of said shape features.

In preferred embodiments the shaped abrasive particles comprise at least one of the aforementioned shape features in combination with a substantially triangular shape of the perimeter of the first and optionally the second face.

In other preferred embodiments the shaped abrasive particles comprise at least one of the aforementioned shape features in combination with a substantially quadrilateral first geometric shape.

In other preferred embodiments, the shaped abrasive particle comprises a combination of two or more (for example, of three, four, five or more) of the recited shape features. For example, the abrasive particle can comprise an opening and a first face that is shaped outwardly (or convex) and a recessed (or concave) second face; a second face comprising a plurality of grooves and a low roundness factor; or an opening and a first face that is shaped outwardly (or convex) and a recessed (or concave) second face.

The shaped abrasive particles preferably have a perimeter of the first and optionally of the second face that comprises one or more corner points having a sharp tip. Preferably, all of the corner points comprised by the perimeter(s) have sharp tips. The shaped abrasive particles preferably also have sharp tips along any edges that may be present in a sidewall (for example between two meeting facets comprised by a sidewall).

The sharpness of a corner point can be characterized by the radius of curvature along said corner point, wherein the radius extends to the interior side of the perimeter.

In various embodiments of the invention, the radius of curvature (also referred to herein as average tip radius) can be less than 75 microns, or less than 50 microns, or less than 25 microns. It is believed that a sharper edge promotes more aggressive cutting and improved fracturing of the shaped abrasive particles during use.

A smaller radius of curvature means that the particle more perfectly replicates the edge or corner features of the mold used to prepare the particle (i.e. of the ideal shape of the particle), i.e. the shaped abrasive particles are much more precisely made. Typically, shaped abrasive articles (in particular, ceramic shaped abrasive particles) made by using a mold of the desired shape provide more precisely made particles than methods based on other methods for preparing shaped abrasive particles, such as methods based on pressing, punching or extruding.

The shaped abrasive particles may comprise an opening. The opening can pass completely through the first side and the second side. Alternatively, the opening can comprise a blind hole which may not pass completely through both sides.

In one embodiment, the size of the opening can be quite large relative to the area defined by the perimeter of the first face or the second face (if present).

The opening can comprise a geometric shape which may be the same or a different geometric shape than that of the first geometric shape and the second geometric shape.

An opening ratio of the opening area divided by the face area of the larger of either the first face or the second face can be between about 0.05 to about 0.95, or between about 0.1 to about 0.9, or between about 0.1 to about 0.7, between about 0.05 to about 0.5, or between about 0.05 to about 0.3. For the purposes of this calculation, the face area is based on the area enclosed by the perimeter without subtracting any area due to the opening.

Shaped abrasive particles with an opening can have several benefits over solid, shaped abrasive particles without an opening. First, the shaped abrasive particles with an opening have an enhanced cut rate as compared to solid, shaped abrasive particles. Shaped abrasive particles having a larger opening relative to the face size may have enhanced grinding performance.

The inner surface of the opening can have varying contours. For example, the contour of the inner surface may be planar, convex, or concave depending on the shape of the upstanding mold element used for the manufacture of the shaped abrasive particle with an opening. Additionally, the inner surface can be tapered such that the size of the opening in each face is different. It is preferred that the inner surface is a tapered surface such that the opening is narrower at the top of the mold cavity and wider at the bottom of the mold cavity for best release of the shaped abrasive particles from the mold and to prevent cracking of the shaped abrasive particles during drying.

The opening can be selected to have substantially the same shape as the first perimeter. The opening can also be selected to have substantially the same shape as the perimeter of the first face and of the perimeter of the second face. Thus, the shaped abrasive particles with an opening can comprise an integral connection of a plurality of bars joined at their respective ends to form a closed polygon as illustrated for example in FIG. 1A or FIG. 5A of US patent Application Publication 2010/0151201. Alternatively, the shape of the opening can be selected to be different than the shape of the first and optionally of the second perimeter, as illustrated for example in FIG. 5B of US patent Application Publication 2010/0151201. The size and/or shape of the opening can be varied to perform different functions more effectively. In one embodiment, the shape of the opening comprises a substantially triangular shape, more preferably the shape of an equilateral triangle.

Another feature of the shaped abrasive particles with an opening can be an extremely low bulk density as tested by ANSI B74.4-1992 Procedure for Bulk Density of Abrasive Grains. Since the opening can significantly reduce the mass of the shaped abrasive particles without reducing their overall size, the resulting bulk density can be extremely low. Moreover, the bulk density of the shaped abrasive particles can be readily changed and controlled by simply varying the size and shape of the opening in the particles. In various embodiments of the invention, the bulk density of the shaped abrasive particles with an opening can be less than 1.35 $g/cm^3$, or less than 1.20 $g/cm^3$, or less than 1.00 $g/cm^3$, or less than 0.90 $g/cm^3$.

The shaped abrasive particles may comprise at least one non-planar face. For example, the first face may be a non-planar face or both of the first face and the second face may be a non-planar face, or one or both of the first face and the second face could be shaped inwardly (for example recessed or concave) or shaped outwardly (for example convex).

For example, the first face can be shaped inwardly (for example be recessed or concave) and the second face can be substantially planar. Alternatively, the first face can be shaped outwardly (for example be convex) and the second face can be shaped inwardly (for example be recessed or concave), or, the first face can be shaped inwardly (for example be recessed or concave) and the second face can also be shaped inwardly (for example be recessed or concave).

A face which is shaped inwardly (for example a recessed face) may comprise a substantially planar center portion and a plurality of raised corners or upturned points. To further characterize such a face, the curvature of the first face of the shaped abrasive particles can be measured by fitting a sphere using a suitable image analysis program such as a non-linear regression curve-fitting program "NLREG", available from Phillip Sherrod, Brentwood, Tenn., obtained from www.NLREG.com. A recessed face may comprise a radius of a sphere curve fitted to the recessed face by image analysis. The radius can be between about 1 mm to about 25 mm, more preferably about 1 mm to about 14 mm or between about 2 mm to about 7 mm, when the center of the sphere is vertically aligned above the midpoint of the first face 24. In one embodiment, the radius of the fitted sphere to the dish-shaped abrasive particles measured 2.0 mm, in another embodiment 3.2 mm, in another embodiment 5.3 mm, and in another embodiment 13.7 mm.

In one embodiment, the abrasive particles may be described as dish-shaped abrasive particles. In general, the dish-shaped abrasive particles comprise typically thin bodies having a first face, and a second face separated by a sidewall having a varying thickness t. In general, the sidewall thickness is greater at the points or corners of the dish-shaped abrasive particles and thinner at the midpoints of the edges. As such, Tm is less than Tc. In some embodiments, the sidewall is a sloping sidewall having a draft angle alpha greater than 90 degrees as discussed in more detail in the foregoing. More than one sloping sidewall can be present and the slope or draft angle for each sloping sidewall may be the same or different for each side of the dish-shaped abrasive particle, as discussed in the foregoing.

In some embodiments, the first face is shaped inwardly (for example recessed) and the second face and sidewall are substantially planar. By recessed it is meant that that the thickness of the interior of the first face, Ti, is thinner than the thickness of the shaped abrasive particle at portions along the perimeter.

As mentioned, in some embodiments, the recessed face can have a substantially flat center portion and a plurality of upturned points or a plurality of raised corners. The perimeter of the dish-shaped abrasive particle can be flat or straight at portions between the upturned points or corners and the thickness Tc can be much greater than Tm.

In other embodiments, the recessed first face is substantially concave with three upturned points or corners and a substantially planar second face (the shaped abrasive particle is plano-concave). The difference between Tc and Tm is less and there can be a more gradual transition from the interior of the first face to each upturned point as compared to the embodiment wherein the first face is recessed and the second face and sidewall are substantially planar. A recessed face may be the result from the use of a manufacturing method involving sol-gel in a mold cavity and forming a meniscus leaving the first face recessed. As mentioned, the first face can be recessed such that the thickness, Tc, at the points or corners tends to be greater than the thickness, Ti, of the interior of the first face. As such, the points or corners are elevated higher than the interior of the first face.

In various embodiments of the invention, a thickness ratio of Tc/Ti can be between 1.25 to 5.00, or between 1.30 to 4.00, or between 1.30 to 3.00. The thickness ratio can be calculated as described in [0036] of US Patent Application Publication No. 2010/0151195. Triangular dish-shaped abrasive particles have been measured to have thickness ratios between 1.55 to 2.32 in some embodiments. Triangular shaped particles produced by the prior art method disclosed in U.S. Pat. No. 5,366,523 (Rowenhorst et al.) have been measured to have thickness ratios between 0.94 to 1.15 meaning they are essentially flat and are just as likely to be slightly thicker in the middle as they are to be slightly thinner in the middle. Dish-shaped abrasive particles having a thickness ratio greater than 1.20 are statistically different from the Rowenhorst particles at the 95% confidence interval.

One or more draft angle(s) alpha between the second face and the sidewall of the dish-shaped abrasive particle can be varied to change the relative sizes of each face as described in the foregoing.

A preferred embodiment of a dish-shaped abrasive particle is one with a recessed face. The draft angle alpha is approximately 98 degrees and the dish-shaped abrasive particle's perimeter comprises an equilateral triangle. The sides of each triangle measured approximately 1.4 mm long at the perimeter of the first face.

In one embodiment the thickness t can be more uniform. As such, Tm can be approximately equal to Tc.

In one embodiment, the first face is convex and the second face is concave (concavo-convex), for example such that the dish-shaped abrasive particle substantially comprises a triangular section of a spherical shell.

It is believed that the convex face is formed by the sol-gel in the mold cavity releasing from the bottom surface of the mold due to the presence of a mold release agent such as peanut oil during evaporative drying of the sol-gel. The rheology of the sol-gel then results in the convex/concave formation of the first and second face while the perimeter is formed into shape (preferably, a triangular shape) during evaporative drying.

In various embodiments of the invention, the radius of a sphere fitted to the concave second face can be between about 1 mm to about 25 mm, or between about 1 mm to about 14 mm, or between about 2 mm to about 7 mm, when the center of the sphere is vertically aligned above the midpoint of the second face.

In other embodiments of the invention, the first face and the second face of the dish-shaped abrasive particles can both be recessed. In some embodiments, the dish-shaped abrasive particles can be biconcave having a concave first face and a concave second face. Alternatively, other recessed structural geometries can be formed on the second face. For example, a plurality of upturned points or a plurality of raised corners on the second face. In such embodiments, the degree of curvature or flatness of the first face can be controlled to some extent by how the dish-shaped abrasive particles are dried thereby resulting in a recessed or curved first face or a substantially planar first face.

The shaped abrasive particles can comprise a plurality of grooves on one or both of the first side and the second side. Preferably, the second side (i.e., one or more sidewalls, faces or facets comprised by the second side, and more preferably the second face) comprises a plurality of grooves.

The shaped abrasive particles can comprise a plurality of ridges on one or both of the first side and the second side. Preferably, the second side (i.e., one or more sidewalls, faces or facets comprised by the second side, and more preferably the second face) comprises a plurality of ridges.

The plurality of grooves (or ridges) can be formed by a plurality of ridges (or grooves) in the bottom surface of a mold cavity that have been found to make it easier to remove the precursor shaped abrasive particles from the mold.

The plurality of grooves (or ridges) is not particularly limited and can, for example, comprise parallel lines which may or may not extend completely across the side. In terms of this aspect ratio, the shaped abrasive particles for use in the invention can be characterized as having a ratio of the length of the greatest cross-sectional dimension, of from about 2:1 to about 50:1 and more typically greater than about 5:1 to about 25:1. In one embodiment, the plurality of grooves (or ridges) comprises parallel lines extending completely across the second side (preferably across the second face). Preferably, the parallel lines intersect with the perimeter along a first edge at a 90 degree angle. The cross sectional geometry of a groove or ridge can be a truncated triangle, triangle, or other geometry as further discussed in the following. In various embodiments of the invention, the depth, D, of the plurality of grooves can be between about 1 micrometer to about 400 micrometers. Furthermore, a percentage ratio of the groove depth, D, to the dish-shaped abrasive particle's thickness, Tc, (D/Tc expressed as a percent) can be between about 0.1% to about 30%, or between about 0.1% to 20%, or between about 0.1% to 10%, or between about 0.5% to about 5%.

In various embodiments of the invention, the spacing between each groove (or ridge) can be between about 1% to about 50%, or between about 1% to 40%, or between about 1% to 30%, or between about 1% to 20%, or between about 5% to 20% of a face dimension such as the length of one of the edges of the dish-shaped abrasive particle.

According to another embodiment the plurality of grooves comprises a cross hatch pattern of intersecting parallel lines which may or may not extend completely across the face. A first set of parallel lines intersects one edge of the perimeter at a 90 degree angle (having a percent spacing of for example 6.25%) of the edge length of the triangle, and a second set of parallel lines intersects a second edge of the perimeter at a 90 degree angle (having a percent spacing of for example 6.25%) creating the cross hatch pattern and forming a plurality of raised diamonds in the second face. In various embodiments, the cross hatch pattern can use intersecting parallel or non-parallel lines, various percent spacing between the lines, arcuate intersecting lines, or various cross-sectional geometries of the grooves.

In other embodiments of the invention the number of ridges (or grooves) in the bottom surface of each mold cavity can be between 1 and about 100, or between 2 to about 50, or between about 4 to about 25 and thus form a corresponding number of grooves (or ridges) in the shaped abrasive particles.

The shaped abrasive particles may have a low Average Roundness Factor. Such shaped abrasive particles comprise a longitudinal axis extending from a base to the grinding tip of the abrasive article (for example, as shown in FIG. 1 of US Patent Application Publication No. 2010/0319269). The Average Roundness Factor for the shaped abrasive particles can be between about 15% to 0%, or between about 13% to 0%, or between about 12% to 0%, or between about 12% to about 5%.

The geometric shape of the cross-sectional plane resulting from the transverse cut (i.e., the cut transversely at 90 degrees to the longitudinal axis, also simply referred to as cross-sectional shape) of the shaped abrasive particles is not particularly limited and can also vary. A non-circular cross-sectional shape is most preferably used. A circular cross-sectional shape is round, which is believed to be duller. It is believed that a non-circular cross-sectional shape has improved grinding performance since one or more sharp corners can be present and one or more sides could be generally linear similar to a chisel blade. Desirably, the cross-sectional shape is a polygonal shape, including but not limited to, a triangle, a rectangle, a trapezoid, or a pentagon.

In preferred embodiments (such as in the case of particles having a second face wherein at least one or preferably both of the first and second faces is/are shaped inwardly), the size of the cross-sectional shape diminishes from the perimeter of the second face towards the center of the second face. In this connection, the term "center" is not restricted to the exact geometric centre of the geometric shape of second face (i.e. the second geometric shape), although this option is also contemplated and may be preferred in some instances, but is intended to encompass an area generally located in the inside of the geometric shape of the second face as opposed to the boundaries of the second face as defined by the second geometric shape.

In one embodiment, the perimeter of the first and of the second side of the (and preferably of the first and of the second face) of the shaped abrasive particle is triangular and the cross-sectional shape is trapezoidal.

The shaped abrasive particles can also comprise at least one fractured surface (shaped abrasive particles having at least one fractured surface are also referred to herein as fractured shaped abrasive particle or abrasive shard). In other words, the abrasive particles can be shaped abrasive particles, as described in the foregoing, but wherein at least one surface is a fractured surface.

As compared to the same shaped abrasive particle without at least one fractured surface, the fractured abrasive particle can be considered to comprise the major part of the original shape of the comparison particle, such as for example, at least 60%, or 70% or 80% or 90% by volume of the original shape. The term original shape means the same shape but without at least one fractured surface. Typically, the original shape will correspond to the shape of a mold cavity used to prepare the comparative ideally shaped abrasive particle.

Apart from the at least one fractured surface the fractured shaped abrasive particles comprise only precisely formed surfaces defining the major part of the original shape, and thus exclude particles obtained by a mechanical crushing operation.

In one embodiment, the fractured shaped abrasive particle does not comprise more than three, preferably more than two fractured surfaces. In another embodiment, the fractured shaped abrasive particle comprises one fractured surface.

The original shape is not particularly limited and can be selected from geometric shapes as defined in the foregoing with respect to abrasive particles which do not comprise at least one fractured surface.

Fractured shaped abrasive particles can be formed in a mold having the original shape, such as a triangular cavity. Typically, the mold has a plurality of cavities to economically produce the abrasive shards.

In one example, the shaped abrasive particles can comprise a first precisely formed surface, a second precisely formed surface intersecting with the first precisely formed surface at a predetermined angle alpha, a third surface opposite the first precisely formed surface, and a fractured surface.

The first precisely formed surface can be formed by contact with a bottom surface of a cavity in a mold (corresponding to the original shape). The first precisely formed surface substantially replicates the surface finish and shape of the bottom surface of the cavity. The second precisely formed surface of the abrasive shard can be formed by contact with a sidewall of the cavity in the mold. The sidewall is designed to intersect the bottom surface at a predetermined angle alpha (also referred to as draft angle alpha in the present invention). The second precisely formed surface substantially replicates the surface finish and shape of the sidewall of the cavity. The second precisely formed surface is molded by contact with the sidewall of the cavity. As such, at least two surfaces of the resulting abrasive shard are precisely formed and the angle of intersection alpha between the two surfaces is a predetermined angle based on the selected mold geometry. The third surface of the abrasive shard opposite the first precisely formed surface can be randomly wavy or undulating in appearance since it is in contact with the air after the cavity is filled with an abrasive dispersion. The third surface is not precisely formed since it is not molded by contact with the cavity. Often, the third surface is created by scraping or doctoring a top surface of the mold to remove excessive abrasive dispersion from the mold. The doctoring or scraping step results in a subtle waviness or irregularity of the third surface that is visible under magnification. As such, the third surface is similar to a surface created by extrusion, which is also not precisely formed. In the extrusion process, the sol-gel is forced out of a die. As such, the surfaces of the sol-gel exhibits scrape marks, gouges, and/or score lines as a result of the extrusion process. Such marks are created by the relative motion between the sol-gel and the die. Additionally, extruded surfaces from a die can be generally a smooth plane. In contrast, the precisely formed surfaces can replicate a sinusoidal or other more complex geometrical surface having significant variations in height along the length of the surface.

The fractured surface of the abrasive shard generally propagates between the first precisely formed surface and the opposing third surface and between opposing sidewalls of the cavity when the cavity depth is relatively small compared to the area of the bottom surface. The fractured surface is characterized by sharp, jagged points typical of a brittle fracture. The fractured surface can be created by a drying process that cracks or fractures at least the majority of the shaped abrasive particle precursors into at least two pieces while residing in the cavity. This produces abrasive shards having a smaller size than the mold cavity from which they were made. The abrasive shards, once formed, could be reassembled like jigsaw puzzle pieces to reproduce the original cavity shape of the mold from which they were made. The cracking or fracturing of the precursor abrasive particles is believed to occur by ensuring that the surface tension of the abrasive dispersion to the walls of the cavity is greater than the internal attractive forces of the abrasive dispersion as the abrasive dispersion is dried in the cavity.

Another embodiment is a shaped abrasive particle respectively bounded by a polygonal first face (or base), a polygonal second face (or top), and a plurality of sidewalls connecting the base and the top, wherein adjacent sidewalls meet at respective sidewall edges having an average radius of curvature of less than 50 micrometers. For example, referring to FIGS. 6A-6B, exemplary shaped abrasive particle 320 is bounded by a trigonal base 321, a trigonal top 323, and plurality of sidewalls 325a, 325b, 325c connecting base 321 and top 323. Base 321 has sidewall edges 327a, 327b, 327c, having an average radius of curvature of less than 50 micrometers. FIGS. 6C-6D show radius of curvature 329a for sidewall edge 327a. In general, the smaller the radius of curvature, the sharper the sidewall edge will be. Typically, the base and the top of the shaped abrasive particles are substantially parallel, resulting in prismatic or truncated pyramidal (as shown in FIGS. 6A-6B) shapes, although this is not a requirement. As shown, sides 325a, 325b, 325c have equal dimensions and form dihedral angles with base 321 of about 82 degrees. However, it will be recognized that other dihedral angles (including 90 degrees) may also be used. For example, the dihedral angle between the base and each of the sidewalls may independently range from 45 to 90 degrees, typically 70 to 90 degrees, more typically 75 to 85 degrees.

According to particularly preferred embodiments, the shaped abrasive particles have a three-dimensional shape of flat triangular platelets or flat rectangular platelets, with flat triangular platelets being preferred. Such shaped abrasive particles may also be simply referred to as flat triangles or flat rectangles.

Hence, in particularly preferred embodiments, the shaped abrasive particles each comprise a first side and a second side separated by a thickness t, wherein said thickness t is preferably equal to or smaller than the length of the shortest side-related dimension of the particle, wherein said first side comprises (or preferably is) a first face having a perimeter of a first geometric shape, wherein said second side comprises (or preferably is) a second face having a perimeter of a second geometric shape, and wherein said second side is separated from said first side by thickness t and at least one sidewall connecting said second face and said first face, wherein said first geometric shape and said second geometric shapes have substantially identical geometric shapes which may or may not be different in size, wherein said identical geometric shapes are both selected either from triangular shapes or from quadrilateral shapes.

Said first geometric shape is preferably congruent to said second geometric shape, as described previously.

It is also preferred that the first and second face of such particles are substantially planar and substantially parallel to each other.

Preferred triangular and quadrilateral or rectangular shapes are as defined in the foregoing.

The sidewall can also be as defined in the foregoing. For example, the sidewall can be a non-sloping sidewall (i.e., the size of the first geometric shape is identical to the size of the second geometric shape; for example triangular or rectangular prisms) or a sloping sidewall (i.e., the size of the first geometric shape is not identical to and typically larger than the size of the second geometric shape; as, for example, in the case of particles having the shape of truncated triangular or rectangular pyramids, as described herein).

According to another particularly preferred embodiment, the shaped abrasive particles are flat triangular platelets (also simply referred to as flat triangles) or flat rectangular platelets (also simply referred to as flat rectangles), as described above, but wherein at least one of the first and the second face is shaped inwardly (for example recessed or concave).

For example, the first face can be shaped inwardly (for example be recessed or concave) and the second face can be substantially planar or shaped outwardly (for example be convex), or the second face can be shaped inwardly (for example be recessed or concave) and the first face can be substantially planar or shaped outwardly (for example be convex).

Alternatively and more preferably, the first face can be shaped inwardly (for example be recessed or concave) and the second face can also be shaped inwardly (for example be recessed or concave).

For particles according to this embodiment, the thickness typically varies over the planar configuration of the particle and diminishes towards the "center of the particle".

Particles according to this embodiment are also typically characterized by a diminishing area of the cross-sectional shape (perpendicular to the length) towards the center of the particle.

The term "center of the particle" as used in this connection is to be understood in a general way and does not necessarily have to be the geometric center of the particle, although there might be cases where the minimum thickness or the minimum area of the cross-sectional shape can be found at the geometric center of the particle, as described previously.

The shaped abrasive particles used in the present invention can have an abrasives industry specified nominal grade or a nominal screened grade.

Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the shaped abrasive particles can be graded to a nominal screened grade using U.S.A. Standard Test Sieves conforming to ASTM E-11 "Standard Specification for Wire Cloth and Sieves for Testing Purposes." ASTM E-11 proscribes the requirements for the design and construction of testing sieves using a medium of woven wire cloth mounted in a frame for the classification of materials according to a designated particle size. A typical designation may be represented as −18+20 meaning that the shaped abrasive particles pass through a test sieve meeting ASTM E-11 specifications for the number 18 sieve and are retained on a test sieve meeting ASTM E-11 specifications for the number 20 sieve. In one embodiment, the shaped abrasive particles have a particle size such that most of the particles pass through an 18 mesh test sieve and can be retained on a 20, 25, 30, 35, 40, 45, or 50 mesh test sieve. In various embodiments of the invention, the shaped abrasive particles can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

The shaped abrasive particles in accordance with all aspects of the present invention may be comprised in a fraction of abrasive particles (or abrasive fraction), also referred to as blend of abrasive particles in the present invention (for ease of reference the term "blend" as used herein is also intended to include the case that the fraction of abrasive particles comprises 100% by weight of shaped abrasive particles, based on the total amount of abrasive particles present in the fraction (or blend).

A blend can comprise one or more types of shaped abrasive particles in accordance with the present invention and optionally one or more types of abrasive particles which are generally referred to herein as "secondary abrasive particles" (abrasive particles which differ from the shaped abrasive particles to be used in accordance with the present invention). For example, abrasive particles having a shape not in accordance with the present invention (for example filamentary abrasive particles or elongated rods) or conventional non-shaped abrasive particles could be used as secondary abrasive particles.

A blend can comprise shaped abrasive particles in accordance with the present invention and secondary abrasive particles in any amount. Accordingly, the shaped abrasive particles and the secondary abrasive particles may be comprised in a blend, wherein the content of the secondary abrasive particles may be up to 95% by weight based on the total amount of abrasive particles present in the blend or even higher.

In some embodiments, at least 5, 10, 15, 20, 25, 30, 35, 40, 45, 50, 55, 60, 65, 70, 75, 80, 85, 90, 95, or even 100 percent by weight of the blend are shaped abrasive particles according to the present invention, based on the total weight of the blend of abrasive particles. Thus in other highly preferred embodiments, the composition or the bonded abrasive article does not contain secondary abrasive particles.

By way of further illustration, the composition or the bonded abrasive article may contain shaped abrasive particles in any suitable amount, such as from about 5 to about 100% by weight, or 10 to 80, typically, 20 to 60% by weight, or 30 to 50% by weight, based on the total weight of shaped abrasive particles plus secondary abrasive particles in the bonded abrasive article.

While the invention has a most pronounced effect when the abrasive fraction (or blend) includes 100% by weight of shaped abrasive particles in accordance with the present invention based on the total weight of abrasive particles present in the abrasive fraction (or blend), it is also effective when the composition or the bonded abrasive article contains for example as little as 5% by weight of shaped abrasive particles in accordance with the present invention and up to 95% by weight of secondary abrasive particles, based on the total weight of abrasive particles present in the abrasive fraction. Hence, the composition or the bonded abrasive article can contain a total amount of abrasive particles of up to 100% by weight of the abrasive particles according to this invention, based on the total weight of abrasive particles (in other words, the abrasive article or the composition does not contain secondary abrasive particles). In some grinding applications the addition of a secondary abrasive particle is for the purpose of reducing the cost by reducing the amount of premium priced shaped abrasive particles. In other applications a mixture with a secondary abrasive particle may have a synergistic effect.

The secondary abrasive particles may have any suitable particle form (as long as it is different from the shape of the abrasive particle for use in the invention). Exemplary particle forms include but are not limited to particle forms obtained by mechanical crushing operation, agglomerated forms and any other forms that differ from the specific abrasive particle shapes as defined herein.

The materials constituting the secondary abrasive particles are not particularly limited and include any suitable hard or superhard material known to be suitable for use as an abrasive particle. Accordingly, in one embodiment, the secondary abrasive particles comprise a major portion of a hard abrasive material. For example, at least 30%, or at least 50%, or 60% to 100%, or 90% or more, or 100% by weight of the total weight of the secondary abrasive particles are comprised of a hard material. In another embodiment, the secondary abrasive particles comprise a major portion of a superhard abrasive material. For example, at least 30%, or at least 50%, or 60% to 100%, or 90% or more, or 100% by weight of the total weight of the secondary abrasive particles are comprised of a superhard material.

Examples of suitable abrasive materials of secondary abrasive particles include but are not limited to known ceramic materials, carbides, nitrides and other hard and superhard materials and include materials, as exemplified herein with respect to shaped abrasive particles, and the shaped abrasive particles of the invention and the secondary abrasive particles can be independently selected from particles of such exemplified materials or any combination thereof.

Representative examples of materials of secondary abrasive particles include for example particles of fused aluminum oxide, e.g., white fused alumina, heat treated aluminum oxide, ceramic aluminum oxide materials such as those commercially available under the trade designation 3M CERAMIC ABRASIVE GRAIN from 3M Company of St. Paul, Minn., sintered aluminum oxide, silicon carbide (including black silicon carbide and green silicon carbide), titanium diboride, boron carbide, tungsten carbide, titanium carbide, diamond, cubic boron nitride, garnet, fused alumina-zirconia, sol-gel derived abrasive particles (including sol-gel-derived aluminum oxide particles), cerium oxide, zirconium oxide, titanium oxide. Examples of sol-gel derived abrasive particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.).

In a preferred embodiment, the secondary abrasive particles are selected from particles of fused oxide materials, including fused aluminum oxide materials or fused alumina-zirconia, preferably fused aluminum oxide.

In another preferred embodiment, the secondary abrasive particles are selected from particles of superabrasive materials, for example cubic boron nitride and natural or synthetic diamond. Suitable diamond or cubic boron nitride materials can be crystalline or polycrystalline. A preferred superabrasive material for use as secondary abrasive particles is cubic boron nitride.

In yet another embodiment, the secondary abrasive particles are selected from particles of silicon carbide materials.

The secondary abrasives particles comprised in the blend may have an abrasives industry specified nominal grade or a nominal screened grade. As mentioned, the shaped abrasive particles may also have an abrasive industry specified nominal grade or a nominal screened grade and the grade(s) of the secondary abrasive particles and the grade(s) of the shaped abrasive particles of the present invention can be independently selected from any useful grade.

In preferred embodiments the secondary abrasive particles can be characterized by a nominal size grade (or grades, e.g., if a plurality of grades is used) (for example according to FEPA) which is smaller than the largest dimension of said shaped abrasive particle.

For example, the composition or the bonded abrasive article may further comprise crushed secondary abrasive particles (excluding abrasive shards as defined herein) which can optionally correspond to an abrasive industry specified nominal graded or combination thereof. The crushed abrasive particles can be of a finer size grade or grades (e.g., if a plurality of size grades are used) than the shaped abrasive particles. In some embodiments, the crushed abrasive particles can be of a coarser size grade or grades (e.g., if a plurality of size grades are used) than the shaped abrasive particles.

Typically, conventional crushed abrasive particles are independently sized according to an abrasives industry recognized specified nominal grade. Exemplary abrasive industry recognized grading standards and grades for secondary abrasive particles include those as mentioned with respect to shaped abrasive particles.

Methods to provide shaped abrasive particles are known in the art and include technologies based on (1) fusion, (2) sintering, and (3) chemical ceramic. While preferred shaped abrasive particles can be obtained by using chemical ceramic technology, non-ceramic shaped abrasive particles are also included within the scope of the present invention. In the description of the invention, methods for preparing shaped abrasive particles may be described with specific reference to ceramic shaped abrasive particles, particularly alumina based ceramic shaped abrasive particles. It is to be understood however that the invention is not limited to alumina but is capable of being adapted for use with a plurality of different hard and superhard materials.

The shaped abrasive particles used in the present invention can typically be made using tools (i.e., molds), cut using diamond tooling, which provides higher feature definition than other fabrication alternatives such as, for example, stamping or punching. Typically, the cavities in the tool surface have planar faces that meet along sharp edges, and form the sides and top of a truncated pyramid. The resultant shaped abrasive particles have a respective nominal average shape that corresponds to the shape of cavities (e.g., truncated pyramid) in the tool surface; however, variations (e.g., random variations) from the nominal average shape may occur during manufacture, and shaped abrasive particles exhibiting such variations are included within the definition of shaped abrasive particles as used herein.

Shaped abrasive particles (for example alpha-alumina based ceramic particles) can be made according to a multi-step process typically using a dimensionally stable dispersion of a suitable precursor (for example a ceramic precursor).

The dispersion that is typically employed in the process may be any dispersion of a suitable precursor and by this is intended a finely dispersed material that, after being subjected to a process suitable in the invention, is in the form of a shaped abrasive particle. The precursor may be chemically a precursor, as for example boehmite is a chemical precursor of alpha alumina; a morphological precursor as for example gamma alumina is a morphological precursor of alpha alumina; as well as (or alternatively), physically a precursor in the sense of that a finely divided form of alpha alumina can be formed into a shape and sintered to retain that shape. In typical cases, the dimensionally stable dispersion of a suitable precursor is a sol-gel.

Where the dispersion comprises a physical or morphological precursor as the term is used herein, the precursor is in the form of finely divided powder grains that, when sintered together, form an abrasive particle of utility in conventional bonded and coated abrasive applications. Such materials generally comprise powder grains with an average size of less than about 20 microns, preferably less than about 10 microns and most preferably less than about a micron. The solids content of a dispersion of a physical or a morphological precursor is preferably from about 40 to 65% though higher solids contents of up to about 80% can be used. An organic compound is frequently used along with the finely divided grains in such dispersions as a suspending agent or perhaps as a temporary binder until the particle has been dried sufficiently to maintain its shape. This can be any of those generally known for such purposes such as polyethylene glycol, sorbitan esters and the like.

The solids content of a chemical precursor that changes to its final stable (for example, ceramic) form upon heating may need to take into account water that may be liberated from the precursor during drying and firing to sinter the particles. In such cases the solids content is typically somewhat lower such as about 75% or lower and more preferably between about 30% and about 50%. With a boehmite gel a maximum solids content of about 60% or even 40% is preferred and a gel with a peptized minimum solids content of about 20% may also be used.

Particles made from physical precursors will typically need to be fired at higher temperatures than those formed from a seeded chemical precursor. For example, whereas particles of a seeded boehmite gel form an essentially fully densified alpha alumina at temperatures below about 1250° C., particles made from alpha alumina gels require a firing temperature of above about 1400° C. for full densification.

By way of example, a method suitable for use in the present invention comprises chemical ceramic technology involving converting a colloidal dispersion or hydrosol (sometimes called a sol), optionally in a mixture with solutions of other metal oxide precursors, to a gel or any other physical state that restrains the mobility of the components, drying, and firing to obtain a ceramic material. A sol can be prepared by any of several methods, including precipitation of a metal hydroxide from an aqueous solution followed by peptization, dialysis of anions from a solution of metal salt, solvent extraction of an anion from a solution of a metal salt, hydrothermal decomposition of a solution of a metal salt having a volatile anion. The sol optionally contains metal oxide or precursor thereof and is transformed to a semi-rigid solid state of limited mobility such as a gel by, e.g., partial extraction of the solvent, e.g., water, the gel can be shaped by any convenient method such as pressing, molding, or extruding, to provide a shaped abrasive grain.

An exemplary method involving chemical ceramic technology comprises the steps of making a dimensionally stable dispersion of a ceramic precursor (which may for example include either a seeded or non-seeded sol-gel alpha alumina precursor dispersion that can be converted into alpha alumina); filling one or more mold cavities having the desired outer shape of the shaped abrasive particle with the dimensionally stable dispersion of a ceramic precursor, drying the stable dispersion of a ceramic precursor to form precursor ceramic shaped abrasive particles; removing the precursor ceramic shaped abrasive particles from the mold cavities; calcining the precursor ceramic shaped abrasive particles to form calcined, precursor ceramic shaped abrasive particles, and then sintering the calcined, precursor ceramic shaped abrasive particles to form ceramic shaped abrasive particles. The process is described in more detail in U.S. Pat. No. 5,201,916 (Berg et al.).

The materials that can be made into shaped particles of the invention include physical precursors such as finely divided particles of known ceramic materials, carbides, nitrides such as alpha alumina, tungsten carbide, silicon carbide, titanium nitride, alumina/zirconia and cubic boron nitride (CBN). Also included are chemical and/or morphological precursors such as aluminum trihydrate, boehmite, gamma alumina and other transitional aluminas and bauxite. The most useful of the above are typically based on alumina, and its physical or chemical precursors and in the specific descriptions that follow a method suitable for use in the invention is illustrated with specific reference to alumina.

Other components that have been found to be desirable in certain circumstances for the production of alumina-based particles include nucleating agents such as finely divided alpha alumina, ferric oxide, chromium oxide and other materials capable of nucleating the transformation of precursor forms to the alpha alumina form; oxides of magnesium; titanium; zirconium; yttrium; and other rare earth metal oxides. Such additives often act as crystal growth limiters or boundary phase modifiers. The amount of such additives in the precursor is usually less than about 10% and often less than 5% by weight (solids basis).

It is also possible to use, instead of a chemical or morphological precursor of alpha alumina, a slip of finely divided alpha alumina itself together with an organic compound that will maintain it in suspension and act as a temporary binder while the particle is being fired to essentially full densification. In such cases it is often possible to include in the suspension materials that will form a separate phase upon firing or that can act as an aid in maintaining the structural integrity of the shaped particles either during drying and firing, or after firing. Such materials may be present as impurities. If for example the precursor is finely divided bauxite, there will be a small proportion of vitreous material present that will form a second phase after the powder grains are sintered together to form the shaped particle.

Ceramic shaped abrasive particles composed of crystallites of alpha alumina, magnesium alumina spinel, and a rare earth hexagonal aluminate may also be used. Such particles may be prepared using sol-gel precursor alpha alumina particles according to methods described in, for example, U.S. Pat. No. 5,213,591 (Celikkaya et al.) and U.S. Publ. Patent Appl. Nos. 2009/0165394 A1 (Culler et al.) and 2009/0169816 A1 (Erickson et al.).

In some embodiments, ceramic shaped abrasive particles can be made according to a multistep process. The process will now be described in greater detail with specific reference to alumina. Generally, alpha alumina based shaped abrasive particles can be made from a dispersion of aluminum oxide monohydrate that is gelled, molded to shape, dried to retain the shape, calcined, and sintered as is known in the art. The shaped abrasive particle's shape is retained without the need for a binder.

The first process step of the multi-step process involves providing either a seeded or non-seeded dispersion of an alpha alumina precursor that can be converted into alpha alumina. The alpha alumina precursor dispersion often comprises a liquid that is a volatile component. In one embodiment, the volatile component is water. The dispersion should comprise a sufficient amount of liquid for the viscosity of the dispersion to be sufficiently low to enable filling mold cavities and replicating the mold surfaces, but not so much liquid as to cause subsequent removal of the liquid from the mold cavity to be prohibitively expensive. In one embodiment, the alpha alumina precursor dispersion comprises from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the alpha alumina precursor dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trade designations "DISPERAL", and "DISPAL", both available from Sasol North America, Inc. of Houston, Tex., or "HiQ-40" available from BASF Corporation of Florham Park, N.J. These aluminum oxide monohydrates are relatively pure; that is, they include relatively little, if any, hydrate phases other than monohydrates, and have a high surface area.

The physical properties of the resulting ceramic shaped abrasive particles will generally depend upon the type of material used in the alpha alumina precursor dispersion. In one embodiment, the alpha alumina precursor dispersion is in a gel state. As used herein, a "gel" is a three-dimensional network of solids dispersed in a liquid.

The alpha alumina precursor dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the alpha alumina precursor dispersion can be varied based on skill in the art.

Typically, the introduction of a modifying additive or precursor of a modifying additive will cause the alpha alumina precursor dispersion to gel. The alpha alumina precursor dispersion can also be induced to gel by application of heat over a period of time. The alpha alumina precursor dispersion can also contain a nucleating agent (seeding) to enhance the transformation of hydrated or calcined aluminum oxide to alpha alumina. Nucleating agents suitable for this invention include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such alpha alumina precursor dispersions is disclosed in U.S. Pat. No. 4,744,802 (Schwabel).

A peptizing agent can be added to the alpha alumina precursor dispersion to produce a more stable hydrosol or colloidal alpha alumina precursor dispersion. Suitable peptizing agents are monoprotic acids or acid compounds such as acetic acid, hydrochloric acid, formic acid, and nitric acid. Multiprotic acids can also be used but they can rapidly gel the alpha alumina precursor dispersion, making it difficult to handle or to introduce additional components thereto. Some commercial sources of boehmite contain an acid titer (such as absorbed formic or nitric acid) that will assist in forming a stable alpha alumina precursor dispersion.

The alpha alumina precursor dispersion can be formed by any suitable means, such as, for example, by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired. The alpha alumina abrasive particles may contain silica and iron oxide as disclosed in U.S. Pat. No. 5,645,619 (Erickson et al.). The alpha alumina abrasive particles may contain zirconia as disclosed in U.S. Pat. No. 5,551,963 (Larmie). Alternatively, the alpha alumina abrasive particles can have a microstructure or additives as disclosed in U.S. Pat. No. 6,277,161 (Castro).

The second process step involves providing a mold having at least one mold cavity, and preferably a plurality of cavities. The mold can have a generally planar bottom surface and a plurality of mold cavities. The plurality of cavities can be formed in a production tool. The production tool can be a belt, a sheet, a continuous web, a coating roll such as a rotogravure roll, a sleeve mounted on a coating roll, or die. In one embodiment, the production tool comprises polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one embodiment, the entire tooling is made from a polymeric or thermoplastic material. In another embodiment, the surfaces of the tooling in contact with the sol-gel while drying, such as the surfaces of the plurality of cavities, comprises polymeric or thermoplastic materials and other portions of the tooling can be made from other materials. A suitable polymeric coating may be applied to a metal tooling to change its surface tension properties by way of example.

A polymeric or thermoplastic tool can be replicated off a metal master tool. The master tool will have the inverse pattern desired for the production tool. The master tool can be made in the same manner as the production tool. In one embodiment, the master tool is made out of metal, e.g., nickel and is diamond turned. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et aL); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface or bottom surface of the mold. In some instances, the cavities can extend for the entire thickness of the mold. Alternatively, the cavities can extend only for a portion of the thickness of the mold. In one embodiment, the top surface is substantially parallel to bottom surface of the mold with the cavities having a substantially uniform depth. At least one side of the mold, that is, the side in which the cavities are formed, can remain exposed to the surrounding atmosphere during the step in which the volatile component is removed.

The cavities have a specified three-dimensional shape to make the ceramic shaped abrasive particles. The depth dimension is equal to the perpendicular distance from the top surface to the lowermost point on the bottom surface. The depth of a given cavity can be uniform or can vary along its length and/or width. The cavities of a given mold can be of the same shape or of different shapes.

The third process step involves filling the cavities in the mold with the alpha alumina precursor dispersion (e.g., by a conventional technique). In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc stearate, and graphite. In general, mold release agent such as peanut oil, in a liquid, such as water or alcohol, is applied to the surfaces of the production tooling in contact with the sot-gel such that between about 0.1 mg/in$^2$ (0.02 mg/cm$^2$) to about 3.0 mg/in$^2$ 0.46 mg/cm$^2$), or between about 0.1 mg/in$^2$ (0.02 mg/cm$^2$) to about 5.0 mg/in$^2$ (0.78 mg/cm$^2$) of the mold release agent is present per unit area of the mold when a mold release is desired. In some embodiments, the top surface of the mold is coated with the alpha alumina precursor dispersion. The alpha alumina precursor dispersion can be pumped onto the top surface.

Next, a scraper or leveler bar can be used to force the alpha alumina precursor dispersion fully into the cavity of the mold. The remaining portion of the alpha alumina precursor dispersion that does not enter cavity can be removed from top surface of the mold and recycled. In some embodiments, a small portion of the alpha alumina precursor dispersion can remain on the top surface and in other embodiments the top surface is substantially free of the dispersion. The pressure applied by the scraper or leveler bar is typically less than 100 psi (0.7 MPa), less than 50 psi (0.3 MPa), or even less than 10 psi (69 kPa). In some embodiments, no exposed surface of the alpha alumina precursor dispersion extends substantially beyond the top surface to ensure uniformity in thickness of the resulting ceramic shaped abrasive particles.

The fourth process step involves removing the volatile component to dry the dispersion. Desirably, the volatile component is removed by fast evaporation rates. In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic. In one embodiment, for a water dispersion of between about 40 to 50 percent solids and a polypropylene mold, the drying temperatures can be between about 90° C. to about 165° C., or between about 105° C. to about 150° C., or between about 105° C. to about 120° C. Higher temperatures can lead to improved production speeds but can also lead to degradation of the polypropylene tooling limiting its useful life as a mold.

The fifth process step involves removing resultant precursor ceramic shaped abrasive particles from the mold cavities. The precursor ceramic shaped abrasive particles can be removed from the cavities by using the following processes alone or in combination on the mold: gravity, vibration, ultrasonic vibration, vacuum, or pressurized air to remove the particles from the mold cavities.

The precursor abrasive particles can be further dried outside of the mold. If the alpha alumina precursor dispersion is dried to the desired level in the mold, this additional drying step is not necessary. However, in some instances it may be economical to employ this additional drying step to minimize the time that the alpha alumina precursor dispersion resides in the mold. Typically, the precursor ceramic shaped abrasive particles will be dried from 10 to 480 minutes, or from 120 to 400 minutes, at a temperature from 50° C. to 160° C., or at 120° C. to 150° C.

The sixth process step involves calcining the precursor ceramic shaped abrasive particles. During calcining, essentially all the volatile material is removed, and the various components that were present in the alpha alumina precursor dispersion are transformed into metal oxides. The precursor ceramic shaped abrasive particles are generally heated to a temperature from 400° C. to 800° C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor ceramic shaped abrasive particles. Then the precursor ceramic shaped abrasive particles are pre-fired again. This option is further described in U.S. Pat. No. 5,164,348 (Wood).

The seventh process step involves sintering the calcined, precursor ceramic shaped abrasive particles to form alpha alumina particles. Prior to sintering, the calcined, precursor ceramic shaped abrasive particles are not completely densified and thus lack the desired hardness to be used as ceramic shaped abrasive particles. Sintering takes place by heating the calcined, precursor ceramic shaped abrasive particles to a temperature of from 1000° C. to 1650° C. and maintaining them within this temperature range until substantially all of the alpha alumina monohydrate (or equivalent) is converted to alpha alumina and the porosity is reduced to less than 15 percent by volume. The length of time to which the calcined, precursor ceramic shaped abrasive particles must be exposed to the sintering temperature to achieve this level of conversion depends upon various factors but usually from five seconds to 48 hours is typical.

In another embodiment, the duration for the sintering step ranges from one minute to 90 minutes. After sintering, the ceramic shaped abrasive particles can have a Vickers hardness of 10 GPa, 16 GPa, 18 GPa, 20 GPa, or greater.

Other steps can be used to modify the described process such as, for example, rapidly heating the material from the calcining temperature to the sintering temperature, centrifuging the alpha alumina precursor dispersion to remove sludge and/or waste. Moreover, the process can be modified by combining two or more of the process steps if desired. Conventional process steps that can be used to modify the process of this disclosure are more fully described in U.S. Pat. No. 4,314,827 (Leitheiser). More information concerning methods to make ceramic shaped abrasive particles is disclosed in US Patent Application Publication No. 2009/0165394 A1 (Culler et al.).

Methods for making shaped abrasive particles having at least one sloping sidewall are for example described in US Patent Application Publication Nos. 2010/0151196 and 2009/0165394. Methods for making shaped abrasive particles having an opening are for example described in US Patent Application Publication No. 2010/0151201 and 2009/0165394. Methods for making shaped abrasive particles having grooves on at least one side are for example described in US Patent Application Publication No. 2010/0146867. Methods for making dish-shaped abrasive particles are for example described in US Patent Application Publication Nos. 2010/0151195 and 2009/0165394. Methods for making shaped abrasive particles with low Roundness Factor are for example described in US Patent Application Publication No, 2010/0319269. Methods for making shaped abrasive particles with at least one fractured surface are for example described in US Patent Application Publication Nos. 2009/0169816 and 2009/0165394. Methods for making abrasive particles wherein the second side comprises a vertex (for example, dual tapered abrasive particles) or a ridge line (for example, roof shaped particles) are for example described in WO 2011/068714.

The composition and the bonded abrasive article according to the present invention comprise a bonding medium. The bonding medium serves to retain the shaped abrasive particles (and any optional components, such as secondary abrasive particles, fillers and additives) in the bonded composition or in the bonded abrasive article.

According to the present invention, the bonding medium comprises a vitreous (also referred to as vitrified) bond phase. In a preferred embodiment, the bonding medium is a vitreous bond (phase). The vitreous bond serves to retain the shaped abrasive particles (and any optional secondary abrasive particles as described herein) in the composition or in the article. The vitreous bond phase which binds together the abrasive particles (shaped abrasive particle and any optional secondary abrasive particles) can be of any suitable composition.

The vitreous bond phase, also known in the art as a "vitrified bond", "vitreous bond", "ceramic bond" or "glass bond", may be produced from a vitreous bond precursor composition comprising a mixture or combination of one or more raw materials that when heated to a high temperature melt and/or fuse to form an integral vitreous matrix phase.

The raw materials are not particularly limited. Typical raw materials for forming a vitreous bond phase can be selected from metal oxides (including metalloid oxides), non-metal oxides, non-metal compounds, silicates and naturally occurring and synthetic minerals, and combinations of one or more of these raw materials.

Metal oxides can for example be selected from silicon oxide, aluminium oxide, magnesium oxide, calcium oxide, barium oxide, lithium oxide, sodium oxide, potassium oxide, iron oxide, titanium oxide, manganese oxide, zinc oxide, and metal oxides that can be characterized as pigments such as cobalt oxide, chromium oxide, or iron oxide, and combinations thereof.

Non-metal oxides can for example be selected from boron oxide or phosphorous oxide and combinations thereof.

Suitable examples for non-metal compounds include boric acid.

Silicates can for example be selected from aluminum silicates, borosilicates, calcium silicates, magnesium silicates, sodium silicates, magnesium silicates, lithium silicates, and combinations thereof.

Minerals can for example be selected from clay, feldspar, kaolin, wollastonite, borax, quartz, soda ash, limestone, dolomite, chalk, and combinations thereof.

In the present invention, the vitreous bond phase may also be formed from a frit, i.e. a composition that has been prefired prior to its employment in a vitreous bond precursor composition for forming the vitreous bond phase of a bonded abrasive article. As used herein, the term "frit" is a generic term for a material that is formed by thoroughly blending a mixture comprising one or more frit forming components, followed by heating (also referred to as pre-firing) the mixture to a temperature at least high enough to melt it; cooling the glass and pulverizing it. The frit forming components are usually mixed together as powders, fired to fuse the mixture and then the fused mixture is cooled. The cooled mixture is crushed and screened to a fine powder is then be used as a frit bond. The fineness of the powder is not particularly limited. Examples of illustrative particle sizes include but are not limited to particle sizes of 35 µm or 63 µm. It is this final powder that may be used in a vitreous bond precursor composition to prepare the vitreous bond of a bonded abrasive article of the invention, such as a grinding wheel.

Frits, their sources and compositions are well known in the art. Frit forming components include materials which have been previously referred to as raw materials for forming a vitreous bond. Frits are well known materials and have been used for many years as enamels for coating, for example, porcelain, metals and jewelry, but also for vitreous bonds of technical ceramics and grinding wheels. Frits as well as ceramic bonds for vitrified bonded abrasive articles are commercially available from suppliers such as Ferro Corporation, 1000 Lakeside Avenue, Cleveland, Ohio, USA 44114-7000 and Reimbold & Strick, Cologne, Germany. Frits for the use in vitrified bonded abrasive articles typically show melting temperatures in the range of 500 to 1300° C.

In accordance with the present invention, frits may be used in addition to the raw materials or in lieu of the raw materials. Alternatively, the vitreous bond may be derived from a non-frit containing composition.

For example, a vitreous bond can be formed from a vitreous bond precursor composition comprising from more than 0 to 100% by weight frit, although more typically the composition comprises 3 to 70% frit. The remaining portion of the vitreous bond precursor composition can be a non-frit material.

Suitable ranges for vitrified bond compositions can be specified as follows: 25 to 90% by weight, preferably 35 to 85% by weight, based on the total weight of the vitreous bond, of $SiO_2$; 0 to 40% by weight, preferably 0 to 30% by weight, based on the total weight of the vitreous bond, of $B_2O_3$; 0 to 40% by weight, preferably 5 to 30% by weight, based on the total weight of the vitreous bond, of $Al_2O_3$; 0 to 5% by weight, preferably 0 to 3% by weight, based on the total weight of the vitreous bond, of $Fe_2O_3$, 0 to 5% by weight, preferably 0 to 3% by weight, based on the total weight of the vitreous bond, of $TiO_2$, 0 to 20% by weight, preferably 0 to 10% by weight, based on the total weight of the vitreous bond, of CaO; 0 to 20% by weight, preferably 0 to 10% by weight, based on the total weight of the vitreous bond, of MgO; 0 to 20% by weight, preferably 0 to 10% by weight, based on the total weight of the vitreous bond, of $K_2O$; 0 to 25% by weight, preferably 0 to 15% by weight, based on the total weight of the vitreous bond, of $Na_2O$; 0 to 20% by weight, preferably 0 to 12% by weight, based on the total weight of the vitreous bond, of $Li_2O$; 0 to 10% by weight, preferably 0 to 3% by weight, based on the total weight of the vitreous bond, of ZnO; 0 to 10% by weight, preferably 0 to 3% by weight, based on the total weight of the vitreous bond, of BaO; and 0 to 5% by weight, preferably 0 to 3% by weight, based on the total weight of the vitreous bond, of metallic oxides [e.g. CoO, $Cr_2O_3$ (pigments)].

It is known in the art to use various additives in the making of vitreous bonded abrasive articles both to assist in the making of the abrasive article and/or improve the performance of such articles. Such conventional additives which may also be used in the practice of this invention include but are not limited to lubricants, fillers, temporary binders and processing aids.

Organic binders are preferably used as temporary binders. Typical temporary binders are dextrins, urea resins (including urea formaldehyde resins), polysaccharides, polyethylene glycol, polyacrylates, and any other types of glue etc. These binders may also include a liquid component, such as water or polyethylene glycol, viscosity or pH modifiers and mixing aids. The use of temporary binders may improve homogeneity and the structural quality of the pre-fired or green pressed body as well as of the fired article. Because the binders are burned out during firing, they do not become part of the finished bond or abrasive article.

Vitrified bonded compositions and bonded abrasive articles according to the present invention can be made according to any suitable method. Procedures and conditions well known in the art for producing vitrified bonded abrasive compositions and vitrified bonded abrasive articles (e.g., grinding wheels) and especially procedures and conditions for producing vitreous bonded sol-gel alumina-based abrasive articles may be used to make the vitrified bonded compositions and abrasive articles of this invention. These procedures may employ conventional and well known equipment in the art. An exemplary method for manufacturing a vitrified bonded abrasive composition comprises the steps of:

(a) providing a precursor composition comprising shaped abrasive particles in accordance with the present invention and a vitreous bond precursor composition and optionally one or more components selected from a temporary binder composition (including for example one or more components selected from one or more temporary binder(s) and pore inducing agent(s)) and secondary abrasive particles; and (b) firing the precursor composition at temperatures suitable to produce a vitreous bond (for example at temperatures selected from about 700° C. to about 1500° C.) so as to obtain vitrified bonded abrasive composition.

The method may also comprise steps of imparting a three-dimensional precursor shape to the composition to provide a precursor vitrified bonded abrasive article. The term "precursor vitrified bonded abrasive article" refers to an article not exhibiting a surface profile as defined in the present invention on at least a part of its active surface. A precursor vitrified bonded abrasive article can have any three-dimensional shape, including but not limited to shapes listed in International Standard ISO 525:1999 and International Standard ISO 603:1999, standard types according to standards of FEPA (Federation of European Producers of Abrasives) or other standards as well as non-standard types. By way of illustration, typical shapes can for example include but are not limited to the shape of a wheel, honing stone, grinding segment, mounted point, a grinding worm or other types according to standard forms of FEPA or ISO 525:1999, ISO 603:1999 and other standards as well as non-standard individual types. A preferred shape for a precursor bonded abrasive article is a vitrified bonded abrasive wheel, in particular, a vitrified bonded grinding wheel.

An exemplary method for manufacturing a vitrified bonded abrasive article comprises the steps of:

(a) providing a precursor composition comprising shaped abrasive particles in accordance with the present invention and a vitreous bond precursor composition and optionally one or more components selected from a temporary binder composition (including for example one or more components selected from one or more temporary binder(s) and pore inducing agent(s)) and secondary abrasive particles;

(b) forming the precursor composition to a desired shape so as to obtain a green structure;

(c) optionally, drying the green structure;

(d) firing the green structure obtained in step (b) or (c) at temperatures suitable to produce a vitreous bond (for example at temperatures selected from about 700° C. to about 1500° C.) so as to obtain a precursor vitrified bonded abrasive article.

In some instances, the precursor vitrified bonded abrasive article can be used as such. However, in cases which are more relevant to the present invention, the precursor vitrified bonded abrasive article is further altered in one or more shape features, for example in order to provide on at least a part of its surface a surface profile, typically and preferably by dressing. As discussed in the present invention, the provision of a bonded abrasive article having on at least a part of its surface a surface profile can be difficult in that the dimensions of surface features typically cannot be scaled down to any size.

According to a further aspect, the present invention thus also provides a method for producing a bonded abrasive article, the process comprising (a) providing a precursor vitrified bonded abrasive article; (b) imparting on at least a part of said surface of said precursor vitrified bonded abrasive article a surface profile comprising at least one surface feature, wherein said shaped abrasive particles have a largest dimension of about the same order of magnitude or larger as compared to said surface feature. The method preferably provides a bonded abrasive article having features as described with respect to the second aspect of the invention. Thus, in preferred embodiments the height, the tip radius and one or more corner radii have preferred dimensions as described with respect to the bonded abrasive article of the present invention.

For example, the surface profile of the bonded abrasive article comprises preferably at least one male surface feature having a tip radius R(tip), wherein said tip radius R(tip) and the largest dimension $L_{max}$ of said shaped abrasive particles are characterized by $R(tip) \leq 2 L_{max}$.

Step b) preferably comprises dressing the article so as to impart said surface profile. Dressing can be performed as is known in the art and neither the dressing device nor the particular method of dressing (for example by using rotation as opposed to static dressing devices) is particularly limited. As mentioned previously, dressing is usually performed using a fixed dressing tool such as a single point diamond dresser, Diaform™ fixed dressing tool, multi-point diamond dresser, diamond blade tool and MCD dressing blade, or a rotary dressing tool such as a form dressing roll, PCD form dressing roll, diamond dressing disk, diamond profile roll, diamond radius dressing roll, or a crushing roll made of steel such as hardened tool steel or high speed steel, or hard metal such as tungsten carbide, or others known in the art.

During manufacture of a vitrified bonded abrasive composition or article, the vitreous bond precursor composition, in a powder form, may for example be mixed with a temporary binder (typically an organic binder) which does not form part of the fired vitrified bonding medium. Bonded abrasive articles are typically prepared by forming a green structure comprised of abrasive grain, the vitreous bond precursor composition, and optionally, a temporary binder and other optional additives and fillers. Forming can for example be accomplished by molding with or without pressing. Typical forming pressures can vary within wide ranges and may be selected from pressures ranging from 0 to 400 kg/cm², depending on the composition of the green structure. The precursor composition as such or the green structure is then fired. The vitreous bond phase is usually produced in the firing step, typically at a temperature(s) in the range from about 700° C. to about 1500° C., preferably in the range from about 750° C. to about 1350° C. and most preferably in the range from about 800° C. to about 1300° C. Good results may be also obtained at temperatures of about 1000° C. or less, or from about 1100 to about 1200° C. The actual temperature at which the vitreous bond phase is formed depends, for example, on the particular bond chemistry. Firing of the vitreous bond precursor composition is typically accomplished by raising the temperature from room temperature to the maximum temperature over a prolonged period of time (e.g., about 10-130 hours), holding at the maximum temperature, e.g., for 1-20 hours, and then cooling the fired article to room temperature over an extended period of time, e.g., 10-140 hours. It should be understood that the temperature selected for the firing step and the composition of the vitreous bond phase must be chosen so as to not have a detrimental effect on the physical properties and/or composition of the abrasive particles (shaped and optional secondary particles) contained in the vitrified bonded composition or the abrasive article.

A vitrified bonded composition and a bonded abrasive article according to the present invention comprise shaped abrasive particles (as defined in accordance with the present invention) and a bonding medium comprising a vitreous bond. In addition, the composition and the bonded abrasive article may comprise one or more optional components selected from secondary abrasive particles, fillers and additives.

The amounts of abrasive particles (which may be comprised in a blend including one or more secondary abrasive particles, as described herein) may vary widely and can range for example from 10 to 80% and more preferably from 25 to 60% by volume.

The amount of bonding medium may also vary widely and can range for example from 1 to 60% by volume, more preferably 2.5 to 40% by volume.

Preferably the bonded abrasive article has a density of at least 1.20 g/cm$^3$, more preferably of at least 1.30 g/cm$^3$ and even more preferably a density selected from the range of from 1.35 to 2.65 g/cm$^3$.

Optionally, the composition and the bonded abrasive article can comprise porosity. Bonded abrasive articles containing porosity have an open structure (interlinked or interconnected porosity) which can provide chip clearance for high material removal, transport more coolant into the contact area while decreasing friction, and optimizes the self-sharpening process. Porosity enables a bonded abrasive article to shed used or worn abrasive particles to expose new cutting edges or fresh abrasive particles.

Compositions and bonded abrasive articles according to the present invention can have any useful range of porosity; such as from about 5 to about 80% by volume, preferably from about 20 to about 70% by volume.

Preferably, the composition as well as the bonded abrasive article according to the present invention contains porosity. The porosity can be formed by the natural spacing provided by the packing density of the materials comprised in the bonded abrasive articles and by pore inducing components, as known in the art, or by both.

Pore inducing components can be selected from temporary components (i.e. components not present in the final bonded abrasive composition or in the final bonded abrasive article) non-temporary components (i.e. (components present in the final composition and in the final article) and combinations thereof. Preferred pore inducing components should not leave any chemical traces in a finished composition or abrasive article (i.e. be temporary components), do not expand upon removal, mix well with the abrasive particles and can provide the desired type (e.g. interconnected) and extent of porosity. Pore inducing components are typically used in amounts ranging from 0-40 Vol.-% of the total composition and article, respectively. Typical non-temporary pore inducing components may be selected from materials such as hollow spheres made of materials such as glass, ceramic (aluminium oxide) and glass particles. Typical temporary pore inducing components may be selected from materials such as polymeric materials (including foamed polymeric materials) cork, ground walnut shells, wood particles, organic compounds (such as naphthalene or paradichlorbenzene) and combinations thereof. In preferred embodiments, the composition as well as the abrasive article contain porosity induced by using naphthalene (as a temporary pore inducing component).

Bonded abrasive compositions and articles according to the present invention may contain additional components such as, for example, fillers and additives, as is known in the art. Examples of optional additives that may be contained in a composition or in an article according to the present invention include non-temporary pore inducing agents, as described in the foregoing, and any components used when making the vitreous bond, including but not limited to lubricants, fillers, temporary binders and processing aids.

Except for the surface profile as defined in the present invention, the bonded abrasive articles in accordance with the present invention can have any three-dimensional basis shape which can be imparted with a surface profile. The particular basis shape is not particularly limited (for example wheel-shape or segment shape). Typically, the basis shape is selected depending on factors such as the intended grinding application (including grinding method, grinding conditions and workpiece) as well as customer needs. By way of exemplification, International Standard ISO 603:1999 lists suitable shapes of bonded abrasive articles all of which are useful in the present invention. Standard types according to standards of FEPA (Federation of European Producers of Abrasives) or other standards as well as non-standard types can also be used.

By way of illustration, typical shapes can for example include but are not limited to the shape of a wheel, honing stone, grinding segment, mounted point, a grinding worm or other types according to standard forms of FEPA or ISO 525:1999 and ISO 603:1999 and other standards as well as non-standard individual types.

A preferred bonded abrasive article is a vitrified bonded abrasive wheel, in particular, a vitrified bonded grinding wheel.

The diameter of abrasive wheels in accordance with the present invention is not particularly limited and can for example be selected to range from 1 mm to 2000 mm, or from 10 mm to 1200 mm or from 100 mm to 750 mm, although other dimensions may also be used. Likewise, the thickness of abrasive (grinding) wheels is not particularly limited. For example, the thickness can typically be selected to range from 2 to 600 mm, or from 5 to 350 mm, or from 10 mm to 300 mm, although other dimensions may also be used. For example, a bore diameter may range from 0 mm to 800 mm, more typically from 4 mm to 400 or from 8 mm to 350 mm.

The particular design of the abrasive article (preferably grinding wheel) is not limited and can be selected from "monolithic" designs and "zonal" design (such as segmented and layered designs). Both designs can include the reinforcement of the bore by using glues such as thermosetting resins, for example resins selected from epoxy resins, polycondensates, and phenolic resins.

The abrasive particles (i.e. one or more type of shaped abrasive particles and optionally one or more types of secondary abrasive particles) may be homogeneously or non-homogeneously distributed in the abrasive article, for example be distributed or concentrated in selected areas, layers, segments or portions of the abrasive article. Homogeneous or non-homogeneous distribution may be either as a homogeneous blend or in a way that different types of abrasive particles are located and distributed only in selected areas, layers, segments or portions of the abrasive article.

For example, a bonded abrasive wheel, may comprise at least two distinct sections, including an outer zone (also often referred to as rim or periphery) and an inner zone (also often referred to as core or center portion). The distinct sections may be provided based on differences in one or more aspects selected from the composition of the bond (for example the type of bonding material or the amount of porosity present), the shape of abrasive particles (for example shaped versus crushed or first shape versus second shape), the grit size of abrasive particle (for example, finer versus coarser) and the amount of abrasive particles (for example presence or absence of abrasive particles or first (for example high) amount versus second (for example low) amount). In some embodiments the outer zone comprises shaped abrasive particles according to the present invention whereas the inner zone does not. In other embodiments, the inner zone comprises shaped abrasive particles according to the present invention whereas the outer zone does not.

An abrasive wheel may also contain an inner zone made of a non-vitreous bonding material (such as plastics etc.).

If the bonded abrasive article is an abrasive wheel, such as a grinding wheel, the abrasive particles may be concentrated towards the middle, or only in the outer zone, i.e., the periphery, of the wheel. The center portion may contain a different (higher or lower) amount of abrasive particles.

Another example for a zonal design is an abrasive wheel, such as a grinding wheel, having a rim containing shaped abrasive particles in accordance with the present invention and an inner zone optionally containing and preferably not containing shaped abrasive particles in accordance with the present invention. The inner zone of this design may optionally contain secondary abrasive particles (e.g, fused alumina, sintered alumina) that may have the same or different grit size. This design is also referred to as special centre design which is intended to minimize the grinding wheel costs due to the lack of shaped abrasive particles and at the same time to increase the bursting speed.

In another variation, an abrasive wheel may include two or more types of abrasive particles positioned on different sides of the abrasive wheel. For example, first abrasive particles may be on one side of the wheel with different abrasive particles on the opposite side. Either the first or the second abrasive particles or both are selected from shaped abrasive particles in accordance with the present invention.

However, typically all the abrasive particles are homogenously distributed among each other, because the manufacture of the wheels is easier, and the grinding effect is optimized when the abrasive particles or the two or more types thereof are closely positioned to each other.

In one embodiment, abrasive particles according to the present invention are homogeneously distributed throughout the bonded abrasive article.

According to highly preferred embodiments, the composition or the article comprises a major portion of shaped abrasive particles, i.e. at least 50% by weight and up to 100% by weight of shaped abrasive particles based on the total amount of shaped abrasive particles and any optional secondary abrasive particles. More preferably, the composition or the article comprises at least 70% or 80% by weight and even more preferably more than 90% by weight of shaped abrasive particles based on the total amount of shaped abrasive particles and any optional secondary abrasive particles.

According to highly preferred embodiments, the composition or the article according to the present invention comprises shaped abrasive particles in the form of flat triangles or flat rectangles as described herein, i.e. wherein said first geometric shape and said second geometric shape have substantially identical geometric shapes which may or may not be different in sizes and wherein said identical geometric shapes are both selected from triangular and quadrilateral shapes, more preferably from triangular shapes, as described herein.

According to other highly preferred embodiments, the largest dimension (or length) of said shaped abrasive particles is selected from a range of from about 50 µm to 2650 µm, and more typically from a range of from about 100 µm to about 1400 µm.

Preferably, the composition or the article comprises a combination one or more of the above features, i.e. a combination of one or more feature selected from a major portion of shaped abrasive articles, shaped abrasive particles in the form of flat triangles or flat rectangles, and a largest dimension of shaped abrasive particles being selected from about 50 µm to 2650 µm, and more typically from a range of from about 100 µm to about 1400 µm.

In a further aspect, the present invention also relates to a method for providing a workpiece, the method comprising: (1) providing a workpiece having an initial shape; (2) frictionally contacting at least a portion of the abrasive article according to the present invention with a surface of said workpiece; and (3) moving at least one of the workpiece or the abrasive article to abrade at least a portion of the surface of the workpiece to provide a workpiece having a final shape.

According to the present invention, said final shape typically comprises on at least a part of its surface a final workpiece surface profile which at least partially corresponds to the surface profile of the bonded abrasive article.

According to a preferred embodiment said final workpiece surface profile comprises at least one final workpiece surface feature, wherein said shaped abrasive particles have a largest dimension of about the same order of magnitude or larger as compared to said at least one final workpiece surface feature. A final workpiece surface feature typically has a complementary counterpart in the surface profile of the bonded abrasive article.

In typical cases the surface profile can be selected from patterns including but not limited to a valley, a pattern of ridges and valleys, a triangular depression, a triangular curve, a sinusoidal curve, and others known in the art. In embodiments, said final workpiece surface feature is typically a female surface feature which corresponds to said male surface feature in the bonded abrasive article's surface profile. In preferred embodiments, said surface profile thus comprises at least one female surface feature exhibiting a root radius R(root), wherein said root radius R(root) and the largest dimension $L_{max}$ of said shaped abrasive particles are characterized by R(root)≤2 $L_{max}$.

As used in the present invention, the term "root radius" is intended to broadly refer to the root region of a female surface feature in the final workpiece profile without relating to any specific grinding application or any specific final workpiece profile type. The term "root region" is referred to herein as the profile region of a female surface feature which encompasses the minimum of a female surface feature. Hence, according to the present invention, a root can relate to any kind of workpiece profile and is not limited to workpieces in the form of threads or gears, although such workpieces might be preferred in various embodiments of the invention.

In other words, said final workpiece surface profile preferably comprises at least one female surface feature which corresponds to said male surface feature comprised in said surface profile exhibited by the bonded abrasive article.

The female surface feature thus preferably comprises a root radius R(root) which corresponds to the tip radius R(tip) in the bonded abrasive article.

Typically, a female surface feature in the final workpiece profile corresponds to a male surface feature comprised in the surface profile of the bonded abrasive article Preferred female surface features correspond to preferred male surface features as described herein. The particular shape of the at least one female surface feature is however not limited. For example, a female surface feature may have a longitudinal axis (although this is not a necessary requirement) as described with respect to the male surface feature. A "longitudinal axis" with respect to the female surface feature is understood as an axis extending from a thought base line that can be drawn to the female surface feature and through the root or bottom region of the female surface feature (i.e. the region enclosing the minimum of the female surface feature).

The shape of said female surface feature may be symmetrical to said longitudinal axis. In other embodiments the shape of said female surface feature may not be symmetrical to said longitudinal axis.

A female surface feature generally comprises two flanks (sides) enclosing a bottom (or root) region of the female surface feature. The bottom region typically comprises the minimum of the female surface feature. The bottom region is intended to broadly refer to that surface profile part of the female surface feature joining the two sides or flanks and is not intended to be limited to any particular profile shape of that region.

Hence a bottom region can equally comprise surface features which are flat or round as well as surface feature which are pointed as long as such features are in accordance with the dimensional requirements according to the present invention, preferably with respect to a root radius R(root).

The nature of the flanks is not particularly limited. For example, the two flanks can be identical or be different. Also, the two flanks can be symmetrical to each other with respect to a longitudinal axis of the female surface feature (as defined herein) or they can have a shape which does not result in any kind of symmetry between the two flanks.

For example, the two flanks can be substantially straight lines in which case the bottom region would comprise the part beginning where the substantially straight lines convert to a curve including the minimum of the female surface feature.

The two flanks can be declined against each other so as to include an angle $\varepsilon'$, although this is not a necessary requirement. In other embodiments the two flanks can be substantially parallel to each other (this is defined herein to correspond to an angle $\varepsilon'$ of about 0°). Principally, the angle $\varepsilon'$ is not limited. In typical cases, the angle $\varepsilon'$ is selected to be smaller than about 100°, more typically to be smaller than about 85° or even more typically about 90° C. or less. In preferred cases, the angle $\varepsilon'$ is selected to range from about 28 to about 82°, more preferably from about 33° to about 65° and even more preferably from about 55° to about 63°. However, these ranges are not to be understood as limiting since in even other preferred embodiments, the angle $\varepsilon'$ can for example be selected to range from about 25° to about 45°. In even other embodiments, it might be desirable to have an angle $\varepsilon'$ which substantially corresponds to (and preferably is equal to) 29°, 30°, 35°, 45°, 55°, 60°, 80° or 90°.

The angle $\varepsilon'$ typically corresponds to angle $\varepsilon$ in surface profile of the bonded abrasive article. Examples include but are not limited to the angle of thread (angle between adjacent flanks of a thread), or the angle between adjacent flanks of a gear.

Examples of typical female surface features include but are not limited to a valley, a root, a corner, an edge, and other female profile elements.

Preferred female surface features correspond to preferred male surface features, including but not limited to those shown in FIG. 3.

In other words, said root radius R(root) and the largest dimension $L_{max}$ of said shaped abrasive particles are preferably characterized by R(root)≤2 $L_{max}$. More preferably, the root radius R(root) and the largest dimension $L_{max}$ of said shaped abrasive particles are characterized by R(root)≤$L_{max}$ or more preferably by R(root)≤0.8 $L_{max}$ or by R(root)≤0.7 $L_{max}$ or by R(root)≤0.6 $L_{max}$. Even more preferably, the root radius R(root) and the largest dimension $L_{max}$ of said shaped abrasive particles are characterized by R(root)≤0.5 $L_{max}$ or R(root)≤0.4 $L_{max}$. In most preferred cases, the root radius R(root) and the largest dimension $L_{max}$ of said shaped abrasive particles are characterized by R(root)≤0.35 $L_{max}$.

The term "root radius", or "R(root)" as used herein generally refers to the smallest radius of a curvature which can be fit into a region around the minimum of the female surface feature. As previously described a root radius R(root) in the final workpiece profile (such as a root radius of a thread or of a gear) typically corresponds to a tip radius R(tip) in surface profile of the bonded abrasive article. While not being particularly limited, in preferred embodiments, the root radius R(root) is selected from a range of about 0.01 mm to about 6.00 mm, preferably from a range of about 0.05 to about 3.00 mm.

According to other preferred embodiments, the final workpiece profile comprises a surface feature which exhibits at least one corner radius R(corner) (typically a corner radius which is complementary to a corner radius in the surface profile of the bonded abrasive article), either instead or in addition to a tip radius. A corner radius R(corner) and the largest dimension $L_{max}$ of said shaped abrasive particles are preferably characterized by R(corner)≤2 $L_{max}$. More preferably, a corner radius R(root) and the largest dimension $L_{max}$ of said shaped abrasive particles are characterized by R(corner)≤$L_{max}$ or more preferably by R(corner)≤0.8 $L_{max}$ or by R(corner)≤0.7 $L_{max}$ or by R(corner)≤0.6 $L_{max}$. Even more preferably, a corner radius R(corner) and the largest dimension $L_{max}$ of said shaped abrasive particles are characterized by R(corner)≤0.5 $L_{max}$ or R(corner)≤0.4 $L_{max}$, in most preferred cases, a corner radius R(corner) and the largest dimension $L_{max}$ of said shaped abrasive particles are characterized by R(corner)≤0.35 $L_{max}$.

Examples of final workpiece profiles that can include a tip radius in addition to one or more corner radii include but are not limited to step profiles.

The bonded abrasive articles of this invention can be advantageously used in a wide range of grinding applications.

Beneficial effects may be in particular achieved in grinding applications which involve high material removal rates, in particular grinding applications selected from roughing and semi-roughing operations, i.e. applications typically involving high material removal rates. The present invention is however not limited to grinding applications which involve high material removal rates but may also be beneficially used in grinding applications which do not involve high material removal rates, such as finishing operations. Hence, the bonded abrasive article of this invention can be suitably used in a wide range of grinding application, ranging from roughing operations via semi-roughing to finishing operations.

In particular, the bonded abrasive articles can be suitably used in any kind of grinding application which involves the creation of a final workpiece profile on at least a part of the surface of the workpiece, in particular, a final workpiece profile as defined herein (such grinding applications are also referred to herein for short as "profile grinding applications" for short).

Beneficial effects may be in particular achieved in grinding applications which require high accuracy grinding, typically with respect to the accurate production of the final workpiece surface profile, particularly in deep regions of the profile which can be accurately (i.e. sharply) imparted according to the present invention.

Exemplary grinding applications include but are not limited to standardized and non-standardized grinding applications, for example methods according to DIN-8589:2003.

The bonded abrasive articles of this invention are particularly useful for applications including but not limited to thread grinding, gear grinding, cylindrical grinding, and surface grinding.

The use is not limited to provide any particular threads, gears or surface profiles. Rather, the skilled person can readily establish a suitable grinding application based on the desired workpiece profile. The bonded abrasive articles of the present invention can be used to provide all kinds of threads, gears or surface profiles.

Exemplary threads include but are not limited to V-threads (for example according to DIN 13, Whitworth threads (for example according to DIN 11), pipe threads (for example according to DIN 11), knuckle threads (for example according to DIN 405), acme threads (for example according to DIN 103), metric trapezoidal threads (for example according to DIN 103), buttress threads (for example according to DIN 513), and steel conduit threads (for example according to DIN 40430).

Exemplary gears include but are not limited to spur gears (gears wherein the leading edges of the teeth are parallel with the axis of rotation of the gear; for example according to DIN 868) and helical gears (gears, wherein the leading edges of the teeth are not parallel to the axis of rotation but are set at an angle; for example according to DIN 868), external and internal gears, bevel gears, spiral bevel gears, hypoid gears, crown gears, worms, non circular gears, rack and pinion gears, epicyclic gears, sun and planet gears, harmonic drives, and cage gears.

Exemplary surface profiles include but are not limited patterns selected from a valley, a pattern of valleys and ridges, a triangular depression, a triangular curve, a sinusoidal curve, and others known in the art.

The applied force during abrading is not particularly limited and can be selected on the basis of the grinding application.

During use, the bonded abrasive article can be used dry or preferably wet. During wet grinding, the bonded abrasive article is typically used in conjunction with a grinding fluid which may for example contain water or commercially available lubricants (also referred to as coolants). During wet grinding lubricants are commonly used to cool the workpiece and wheel, lubricate the interface, remove swarf (chips), and clean the wheel. The lubricant is typically applied directly to the grinding area to ensure that the fluid is not carried away by the grinding wheel. The type of lubrication used depends on the workpiece material and can be selected as is known in the art.

Common lubricants can be classified based on their ability to mix with water. A first class suitable for use in the present invention includes oils, such as mineral oils (typically petroleum based oils) and plant oils. A second class suitably for use in the present invention includes emulsions of lubricants (for example mineral oil based lubricants; plant oil based lubricants and semi-synthetic lubricants) and solutions of lubricants (typically semi-synthetic and synthetic lubricants) with water.

Abrasive articles in accordance with the present invention can be used on any grinding machine specific for the grinding method. The grinding machine can be electrically, hydraulically or pneumatically driven, at any suitable speed, generally at speeds from about 10 to 250 m/s.

Bonded abrasive articles according to the present invention are useful, for example, for abrading a workpiece. The bonded abrasive article can be particularly suitable for use on workpieces made of metal, such as steel (including powder metallurgical steel and steel alloys, carbon steels, mild steels, tool steels, stainless steel, hardened steel, ball bearing steel, cold working steel, cast iron), non-ferrous metals and alloys (such as aluminum, titanium, bronze, etc.), hard metals (such as tungsten carbide, titanium carbide, titanium nitride, cermets, etc), ceramics (technical ceramics such as oxide ceramics, silicate ceramics, non-oxide ceramics), and glasses. The use of the bonded abrasive articles is however not restricted to the use on these exemplified workpiece materials.

The bonded abrasive articles of this invention are particularly useful for any grinding application where it is intended to accurately impart a fine final workpiece profile, particularly those having sharp roots. Preferred grinding applications include but not limited to thread grinding, gear grinding, surface grinding and cylindrical grinding which are further illustrated in the following.

Gear Grinding

The term gear grinding as used in the present invention generally refers to a method of generative grinding and profile grinding of gears. Gear wheels determine the transmission ratios of gearboxes; according to the second fundamental law of gearing, this ratio will only remain constant if the next tooth is already engaged before the previous tooth disengages. The more perfectly ground the surface of the tooth flanks, the better is the form fit, and the more smoothly and quietly the gearbox runs. The process of machining the tooth flanks brings with it tough demands in terms of dimensional accuracy and shape accuracy—and also places tough demands particularly on the edge zone properties of the component. Whereas very slight deviations in terms of the macro and micro-geometry—which influence the amount and type of noise generated by the teeth—may be tolerable within strict limits depending on the quality requirements, a "zero tolerance" policy applies to the edge zone of the tooth flank. Damage to the edge zone as a result of influence on the structure will contribute to faster wear of the teeth and can, in extreme cases, cause the tooth to fracture and break off. In the context of these requirements, different techniques may be useful all of which are included within the scope of the present invention.

Exemplary gear grinding techniques include:
- Gear grinding with the continuous generative grinding technique using grinding worms: The bonded abrasive article (typically a grinding wheel) has a shape that corresponds to a grinding worm, the basic tooth profile of which should always be seen as a rack profile. The involute form is generated through continuous generative grinding of the grinding worm and the gearing). The process lends itself very well to the series production of gear wheels.
- Gear grinding with globoidal grinding worms (continuous profile grinding): unlike the continuous generative grinding technique, the shape of the bonded abrasive article in this case does not correspond to a grinding worm with a rack profile as the basic tooth profile. Instead, a globoidal grinding worm maps the contour of the tooth flank. During the grinding process the tooth form is produced through virtually linear engagement of the tool in the tooth gap. This method is predestined for grinding bevel gears which are used primarily in differential gears and can optionally be combined with a subsequent honing step.
- Single flank generating grinding: The involute shape is produced in a generative grinding process in which the grinding wheel only machines a single flank in the direction of grinding per tooth gap. This method allows the machining of different moduli with an unchanged wheel width and allows different infeeds for the left or right-hand tooth flank.
- Form or profile grinding with radial infeed: The involute form is transferred to the bonded abrasive article (most typically a grinding wheel), which then generates the form in the tooth gap of the workpiece.
- Form or profile grinding with rotative infeed: The involute form is transferred to the bonded abrasive article (typically a grinding wheel), which then generates the form in the tooth gap of the workpiece.

Bonded abrasive articles for use in gear grinding applications are not particularly limited and as described in the foregoing. In preferred embodiments, the bonded abrasive articles for use in gear grinding applications may be characterized by a particle shape selected from flat triangles or flat rectangles wherein optionally at least one face is shaped inwardly, as described in the foregoing with respect to particularly preferred particle shapes.

Surface Grinding

Surface grinding or face grinding techniques are commonly divided into peripheral-longitudinal surface grinding (surface grinding, face grinding of large surfaces) and peripheral-transverse surface grinding (flute grinding, profile grinding).

In the case of peripheral-longitudinal grinding, the grinding wheel engages at right angles and advances by the selected feed increment into the workpiece, which is moved by the machine table. In the process, the infeed and feed rate define the grinding result.

Peripheral-transverse surface grinding is ideally suited to producing large, flat surfaces. With this method, the bonded abrasive article is also positioned at right angles to the workpiece, but it is fed in by the amount which exactly corresponds to the width of the bonded abrasive article. Both methods can be used for reciprocating grinding and creep-feed grinding.

With reciprocating grinding, the bonded abrasive article moves over the workpiece "backwards and forwards" at right angles to the reference edge—the resulting motion is described as being "reciprocating". This method is seen as the oldest variant of surface grinding and is characterised by low cutting depths (for example as low as 0.005 to 0.2 mm) and high table speeds (for example ranging from 15 to 30 m/min). The technique is particularly useful for materials which are easy to grind, small batch sizes and low amounts of material removal, as well in cases of relatively low machine investment.

Bonded abrasive articles for use in surface grinding applications are not particularly limited and as described in the foregoing. In preferred embodiments, the bonded abrasive articles for use in surface grinding applications may be characterized by a particle shape selected from flat triangles or flat rectangles wherein optionally at least one face is shaped inwardly, as described in the foregoing with respect to particularly preferred particle shapes Cylindrical Grinding Cylindrical grinding is a grinding technique which is commonly characterized by having one or more and preferably all of the following four features:
(1) The workpiece is constantly rotating; (2) The grinding wheel is constantly rotating; (3) The grinding wheel is fed towards and away from the work; (4) Either the work or the grinding wheel is traversed with the respect to the other.

While the majority of cylindrical grinding applications employ all four movements, there are applications that only employ three of the four actions. Three main types of cylindrical grinding are outside diameter (OD) grinding, inside diameter (ID) grinding, and centerless grinding and any one of these techniques can be suitably used in the present invention:
- Outside diameter (OD) grinding is one of the most frequently used grinding techniques—for example in the automotive industry, where it is used in the grinding of camshafts and crankshafts. During the course of industrial development and in response to the requirements which have emerged as a result, outside diameter grinding has been divided into different variants of the technique which differ depending on the way in which the workpiece is mounted and according to the principle feed direction.
  - Peripheral-transverse outer diameter (OD) grinding between centers (also known as plunge grinding)
  - o Centerless peripheral-transverse outer diameter (OD) grinding
  - o Peripheral-longitudinal outer diameter (OD) grinding between centers (also known as throughfeed grinding)
  - o Centerless peripheral-longitudinal outer diameter (OD) grinding
- In processes of grinding between centers, the workpiece is clamped firmly between two centers in centering fixtures on its end faces, and in this position the workpiece is driven by the grinding machine. Depending on the principle feed direction of the wheel—right-angled plunge feed or parallel movement along the workpiece—this is referred to as transverse or longitudinal grinding.
- In the process of peripheral-transverse outer diameter grinding, the grinding wheel is generally at right angles to the workpiece. This technique is generally used to machine bearing seats, shoulders and grooves using straight plunge grinding. Often the cut-in is divided into several process steps which are performed in sequence with ever decreasing chip removal rates. Depending on the particular task and the size of the batch, angle plunge grinding is another variant which may be more productive.

The process of peripheral-longitudinal outer diameter grinding is particularly suitable for applications requiring cylindrical or conical workpieces which are significantly longer than the width of the grinding wheel. Examples include but are not limited to the machining of press cylinders and rollers for paper production, as well as rollers for use in rolling mills in the steel industry. In this technique the grinding wheel moves parallel to the workpiece and is fed in at the reversal point at right angles to the workpiece. The required finished dimension can either be attained in several passes or in just a single pass—the latter being referred to as peel grinding. These methods are comparable to creep-feed grinding and reciprocating grinding. In the automotive industry, peel grinding is used for example in the production of drive shafts.

Centerless grinding: If the challenge is to machine large quantities of long and/or thin, round components made of pliable or brittle materials, centerless grinding might be the solution. In addition, centerless grinding is a technique which can allow multiple tasks—e.g. roughing and finishing—to be performed in a single pass. The machining process itself corresponds to the other cylindrical grinding techniques like the ones previously mentioned with respect to "Outside diameter grinding"—even without centers the process still involves plunge grinding and through feeding techniques.

Internal diameter (ID) grinding provides perfect functional surfaces in components which need to establish a non-positive connection with an axle or shaft. Similarly to outer diameter (OD) grinding, this method is split into two different techniques according to the direction of grinding:

o Peripheral-transverse internal diameter (ID) grinding (plunge grinding)

o Peripheral-longitudinal internal diameter (ID) grinding

In terms of the behaviour of the grinding wheel and the workpiece, both techniques display virtually identical properties to outer diameter (OD) grinding between centres. Application examples where ID grinding is commonly used include but are not limited to the refining of bores with a high-precision fit; for the machining of hard and super-hard materials, to machine different diameters in a single pass as well as to produce tapered fits and in situations where the grinding wheel needs to be narrower than the surface which is to be machined and a combination of longitudinal and plunge grinding is required. In typical cases the grinding wheel diameter should not exceed ⅔ or a maximum of ⅘ of the bore diameter.

Bonded abrasive articles for use in cylindrical grinding applications are not particularly limited and as described in the foregoing. In preferred embodiments, the bonded abrasive articles for use in cylindrical grinding applications may be characterized by a particle shape selected from flat triangles or flat rectangles wherein optionally at least one face is shaped inwardly, as described in the foregoing with respect to particularly preferred particle shapes.

Surprisingly, bonded abrasive articles in accordance with the present invention have been found to provide excellent results in a wide range of grinding applications and in particular in high precision grinding applications.

For the purposes of the present invention, the term high precision grinding application is intended to refer to higher accuracy in terms of the effective surface profile and the corresponding final workpiece profile than is commonly possible with present day conventional abrasives. Conventional abrasives encompass all types of aluminium oxide including so-called ceramic abrasives, and silicon carbide.

It has been surprisingly found that bonded abrasive articles according to the present invention can exhibit an effective surface profile which is capable of imparting a final profile to a workpiece, and wherein grinding can be performed with higher accuracy in particular down to a greater depth of the workpiece surface profile.

Due to the problems as outlined in the introductory part of the present invention it can be difficult to provide final workpiece profiles exhibiting sharp roots. In particular, due to conventional particles being dislodged from the bonded abrasive article upon wearing (and during dressing), truncation of the tip region of a male surface feature may occur. As a result, a workpiece profile imparted by using a bonded abrasive article wherein the tip region of male surface features are truncated will give rise to a final workpiece profile wherein the corresponding female surface feature is similarly truncated giving rise to root truncation.

The bonded abrasive article according to the present invention can be advantageously used to provide final workplace profiles having an excellent precision within the depth of the workpiece profile, in particular with respect to sharp roots. One exemplary parameter to define the precision of the final workpiece profile is the root radius R(root) of a female surface feature of the final workpiece.

The term root radius is well understood in the relevant technical field. For example with respect to threads, the term "root" means the bottom surface joining sides of two adjacent threads, whereas the term "crest" means the top surface joining two sides of the thread.

The root radius R(root) and the largest dimension $L_{max}$ of said shaped abrasive particles are preferably characterized by R(root)≤2 $L_{max}$. More preferably, the root radius R(root) and the largest dimension $L_{max}$ of said shaped abrasive particles are characterized by R(root)≤0.8 $L_{max}$ or by R(root) ≤0.7 $L_{max}$ or by R(root)≤0.6 $L_{max}$. Even more preferably, the root radius R(root) and the largest dimension $L_{max}$ of said shaped abrasive particles are characterized by R(root)≤0.5 $L_{max}$ or R(root)≤0.4 $L_{max}$. In most preferred cases, the root radius radius R(root) and the largest dimension $L_{max}$ of said shaped abrasive particles are characterized by R(root)≤0.35 $L_{max}$.

It is to be appreciated that the present invention provides a potential of broadly providing all kinds of profiles, particularly those of very fine dimensions. The invention is not limited to any particular absolute dimensions. However, in preferred embodiments the aspects of the present invention as described herein can be useful for providing final workpiece profiles characterized by at least one root radius R(root) selected from a range of about 0.01 mm to about 6.00 mm, preferably from a range of about 0.05 to about 3.00 mm.

In addition to the effects described in the foregoing, bonded abrasive articles of the present invention have been found to provide constant grinding results over a long period of time and also under severe grinding conditions (for example at high specific material removal rates). The present invention thus provides combinations of performance features which have not been achieved in the past.

In addition, bonded abrasive articles in accordance with the present invention can provide a better surface finish (decreased surface roughness $R_a$) on the workpiece used in a wide range of grinding applications ranging from roughing via semi-roughing to finishing operations. During use the bonded abrasive articles can also ensure a reduced risk of damaging the workpiece (such as by workpiece burning or discoloration) while at the same time minimizing the clogging of the bonded abrasive article during use.

Bonded abrasive articles of the present invention are characterized by long dressing cycles thus allowing more workpiece parts to be finalized between dressing cycles as well as a long total serve life of the bonded abrasive article. Due to the higher material removal rates which can be realized using bonded abrasive articles of the present invention, shorter grinding times can be accomplished contributing to a higher workpiece flow in overall.

Another parameter which is often used to characterize the performance of a grinding application is the specific chip volume $V'_w$. $V'_w$ indicates the total amount of workpiece material [mm$^3$] that is removed in a grinding application before dressing has to be set up (i.e. during one grinding cycle). The time after which dressing has to be set up (i.e., the end of the grinding cycle) can be easily recognized by a person skilled in the art of grinding. By way of example, the end of a grinding cycle is typically indicated by a somewhat prominent drop in the power drawn by the grinding machine. Other factors which can be used as additional or alternative indicators for recognizing the end of a grinding cycle include but are not limited to the loss of the form and profile holding of the bonded abrasive article, decrease of workpiece quality, for example burning or discoloration of the workpiece, or worse surface finish indicated by an increased surface roughness $R_a$.

At the end of a grinding cycle, the specific chip volume can be easily calculated by a skilled person, as is known in the art. For the purpose of determining the specific chip volume, the actual start of grinding is taken as the starting point of the grinding cycle. For evaluating the performance of a specific grinding application, the specific material removal rate $Q'_w$ is typically set constant and the performance of the grinding application is evaluated with respect to the specific chip volume $V'_w$.

In practice, the specific chip volume is commonly based on the effective width of the active abrasive article's profile used in the grinding application (i.e. the specific chip volume indicates the total volume of workpiece material removed per 1 mm of width of the bonded abrasive article, for example 1 mm wheel width during one grinding cycle).

Bonded abrasive articles in accordance with the present invention have surprisingly been found to provide excellent results with respect to the specific chip volume $V'_w$, in particular in applications such as gear grinding, thus for example leading into higher set limits for redressing. It is to be emphasized that such excellent results with respect to the chip volume surprisingly can also be achieved at high material removal rates i.e., when using a high constant value of $Q'_w$ during the grinding cycle, Typically, abrasive articles based on conventional abrasive particles show lower specific chip volumes $V'_w$, at a higher specific material removal rate $Q'_w$ as compared to the same grinding application at a lower specific material removal rate $Q'_w$, and typically show adverse effects with respect to the workpiece such as burning or discoloration when used at higher specific material removal rates. Even under these severe grinding conditions no workpiece burning or discoloration was observed when using bonded abrasive articles in accordance with the present invention.

While in particular grinding applications such as gear grinding applications have been found to provide such excellent results with respect to the specific chip volume, other grinding applications are expected to provide similar pronounced effects.

Bonded abrasive articles in accordance with the present invention incorporating shaped abrasive particles as defined herein can provide specific chip volumes that are substantially higher than those commonly achieved with present day conventional abrasives (as defined with respect to high performance grinding applications).

A person skilled in the art of grinding can easily ascertain an appropriate comparable bonded abrasive article. A bonded abrasive article suitable for use as a comparable bonded abrasive article can for example be based on the same abrasive material but with the only difference that the abrasive particles are not shaped. For example, the same bonded abrasive article but wherein the shaped abrasive particles according to the invention are replaced with the same nominal size and weight of crushed abrasive particles having the same chemical composition could be used as a comparable bonded abrasive article. A comparable bonded abrasive article should also contain the same nominal size(s) and weight(s) of any optional secondary abrasive particles having the same chemical composition(s) as used in the bonded abrasive article to be evaluated. Hence, the shaped abrasive particles as defined herein contained in the bonded abrasive article to be evaluated preferably represent the only difference to the comparable bonded abrasive article used when evaluating the specific chip volume $V'_w$. That means that the same type (particularly with respect to the chemical composition) and volume amount of bonding medium (and optionally the same volume amount of porosity, if any) is preferably used for the bonded abrasive article to be evaluated and the comparable bonded abrasive article.

By way of illustration, specific chip volumes as achievable in the present invention are typically higher by factor 2, or 5, or 10, or 15 and even 20 than what is commonly achieved with a comparable bonded abrasive article based on such present day conventional abrasives.

Since the bonded abrasive article is characterized by high form or profile holding less dressing is necessary which translates into therefore better process and tool consumption economics.

The use of shaped abrasive particles (such as flat triangles and flat rectangles as described herein, optionally having one or more faces shaped inwardly), in vitrified bonded abrasive articles allows these beneficial effects to be achieved for a wide range of different compositions of the bonded abrasive article as well as for a wide variety of applications. Although in some applications a most pronounced effect might be achieved when the abrasive article comprises 100% shaped abrasive particles in accordance with the present invention based on the total amount of abrasive particles present in the article, articles containing for example as little as 5% by weight of shaped abrasive particles in accordance with the present invention and up to 95% by weight of secondary abrasive particles, based on the total amount of abrasive particles present in the article, have also been shown to provide excellent performance over a wide range of applications.

The effects achieved in the present invention are also unexpected in view of the fact that the bonded abrasive article typically does not have to comprise the shaped abrasive in any specific orientation. Unlike the situation in comparatively thin coated abrasive articles where orientation may be of advantage, the bonded abrasive article (for example, wheel, segment, layer or part thereof) typically comprises the shaped abrasive particles in a random orientation, although orientation of the particles is not excluded from the scope of the present invention.

Determination of Particle and Surface Profile Dimensions

The dimensions of the shaped abrasive particle (such as length, width and thickness) can be determined using methods known in the art, for example, by using conventional measuring tools such as rulers, vernier callipers, micrometers, or microscopy measurement techniques and typically calculating the average of a suitable number of measurements.

For example, a measuring microscope such as a Nikon MM-40 obtained from Nikon Americas Inc. in Melville, N.Y. according to the following test method can be used: One or more shaped abrasive particles are supported on a glass slide preferably by its largest substantially planar surface (if it has one) in contact with the glass slide (dished or concave surface up if the particle has one.) The glass slide is then placed on the Nikon MM-40 microscope stage. The stage has the ability to move in the X and Y direction and it is also equipped with counters for the X-Y distance traveled. The crosshair is aligned with one of the exterior vertices of the shaped abrasive particle. For example, a thin triangular particle would use one of the three vertices; a rectangular base pyramid would use one of the four rectangular base vertices of the pyramid. The X and Y counters are then reset to zero. The crosshair is then moved clockwise to the next exterior vertex of the geometry being measured and the X and Y readings are recorded. The remaining exterior vertices moving in a clockwise direction are then sequentially measured. The X and Y coordinates of each exterior vertex can then be placed into a spreadsheet and the maximum dimension between any two of the vertices calculated using Pythagoras' theorem.

For a triangle the length is maximum distance between any two adjacent vertices of the three vertices. For a rectangle, the length is the maximum dimension between adjacent vertices. For an elongated parallelogram, the length is the maximum dimension between adjacent vertices. For a kite or a rhombus, the length is the maximum dimension between opposing vertices. The maximum dimension to determine length for alternative geometries can be determined by those of skill in the art when looking at the geometry in the microscope. The width can then be determined perpendicular to the length by using the coordinates of selected vertices or by rotating the stage or slide such that the length dimension is parallel to the X-axis. For a triangle the width is the maximum distance between the side with the longest adjacent vertices and the opposing vertex. For a rectangle, the width is the largest dimension between the two pairs of shorter opposing vertices. For an elongated parallelogram, the width is the maximum dimension between the side with the longest adjacent vertices and the opposing side. For a kite or a rhombus, the width is the shorter dimension between opposing vertices. The maximum dimension to determine width for alternative geometries can be determined by those of skill in the art when looking at the geometry in the microscope.

The Nikon MM-40 microscope is also equipped with a Z-axis scale with a counter. To measure thickness, t, (height from glass slide) the viewfield is first focused on the upper surface of the glass slide using the 100× objective for maximum accuracy. The Z counter is then reset to zero. The viewfield is then moved to the highest possible point of the shaped abrasive particle that can be observed (a lower magnification may be needed to find the highest point) and the microscope refocused at that the highest point at the 100× magnification. The particle's thickness is determined by the Z reading after refocusing.

At least 20 shaped abrasive particles are measured for the dimension of interest (individual length, individual width, individual thickness). The averages of the dimension of interest (individual lengths, widths, thickness dimensions) are determined to define the dimension (length, width, thickness) for the measured shaped abrasive particles respectively.

For the purposes of this measurement, the thickness of a particle having an opening is measured at the site of the actual maximum thickness of the particle (i.e. typically not within the opening). The shortest side related dimension, the width and the length of a particle having an opening are typically measured without subtracting the length of overlap of the opening with any one of these dimensions (if any). For example, the width and length of an equitrilateral, prismatic particle having an opening extending between the first and the second side of uniform thickness t can be measured based on the perimeter of the first face (or the second face) without taking into account the opening.

The volumetric aspect ratio can be determined using methods known in the art, for example by using the actual maximum and minimum cross sectional areas of the particle, and/or exterior dimensions determined by microscopy measurement techniques as previously described and calculating the average of a suitable number (for example 20 or more) of individual particle determinations. For an equilateral triangular shaped abrasive particle, the thickness and side length can be measured by microscopic techniques discussed above and the volumetric aspect ratio determined.

With respect shaped abrasive particle, the radius of curvature can be measured (for example as described in WO2011/109188, page 12, line 25 to page 13, line 7) by using image analysis for example, using a CLEMEX VISION PE image analysis program available from Clemex Technologies, Inc. of Longueuil, Quebec, Canada, interfaced with an inverted light microscope, or other suitable image analysis software/equipment. Using a suitable polished cross-section taken between the first face and the second face may help in microscopic examination of the edge or corner point of a sidewall. The radius of curvature of each point of the shaped abrasive article can be determined by defining three points at the tip of each point (when viewed e.g. at 100× magnification). A point is placed at the start of the tip's curve where there is a transition from the straight edge to the start of a curve, at the apex of the tip, and at the transition from the curved tip back to a straight edge. The image analysis software then draws an arc defined by the three points (start, middle, and end of the curve) and calculates a radius of curvature. The radius of curvature for at least 30 apexes are measured and averaged to determine the average tip radius.

The Average Roundness Factor can be determined as described in [0029] to [0033] of US Patent Application Publication No. 2010/0319269 by using a transverse cut C, as defined in [0029] of said patent application publication.

For the purposes of the present invention, dimensions of surface features of interest in a surface profile of a bonded abrasive article (such as height of a male surface feature, width of a surface feature, depth of the profile, a corner radius or a tip radius) can be readily determined based on methods which are generally well known in the art, for example based on reproducing the effective surface profile of the bonded abrasive article (typically after suitable dressing, that is, by using a dressing method capable of as closely achieving the desired profile as possible, and before use) in a shim of carbon brush (such as "Werkstoff L 53 ZP" of Schunk Kohlenstofftechnik GmbH, Heuchelheim, Germany), and determining the dimension of the surface feature of interest in the reproduced profile using suitable methods and devices known in the art, for example by using a profile projector (such as ISOMA M119 or Hauser machine type 218 of former Henri Hauser AG Biel/Bienne, Switzerland). Another option lies in using a high precision contour measurement device equipped with software capable of accurately determining the dimension(s) of any surface feature(s) of interest, such as radii, distances, angles, maximum points, minimum points. An example for a suitable high precision contour measurement device is MarSurf XC10 with CD120 drive unit, MarSurf ST500 measuring stand, and probe arms for optimal adjustment to measurement tasks of Mahr GmbH Göttingen, Göttingen, Germany).

Dimensions of surface features in a final workpiece profile (such as depth of a female surface feature, width of a surface feature, depth of the profile, a root radius or a corner radius) can be readily determined based on the geometry of final workpiece using suitable methods of measurement as is known in the art, for example using a profile projector (such as ISOMA M119 of ISOMA SA, Biel/Bienne, Switzerland). A suitable digitally method may involve the use of test sheets showing the workpiece profile to be gained and detecting the profile of the workpiece. The root radius is determined by measuring the smallest radius of a curvature which can be fit into a region around the minimum of the female surface feature, for example by placing tangents at the flank of a tooth and measuring the radius of the smallest arc beginning/ending at the point where the tangents start to deviate from the flanks. The corner radius is established as described for the root radius but with respect to a corner region, i.e. by determining the smallest radius of curvature which can be fit into a region comprising the corner.

Objectives and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise noted, grinding was performed wet using lubricants common for the grinding application, such as a 3 to 5% emulsion (v/v) of oil or synthetic lubricant (for example Castrol Syntilo 81 E or Castrol Syntilo CR 4, available from Castrol LTd. or Castrol Group, or Cimtech® D18, available from Cimcool® Fluid Technology, LLC) in water.

Materials Used in the Examples

| | |
|---|---|
| 80+ | Shaped abrasive particles with the composition of 3M ™ Ceramic Abrasive Grain 321 with each abrasive particle shaped as a triangular prism with sloping side walls (side wall draft angle 98 degrees) with two substantially parallel faces, wherein the first face comprises an equilateral triangle with a median dimension of 0.49 mm and the second face also comprises an equilateral triangle of median edge length of 0.415 mm. The average distance between the faces was 0.095 mm. |
| White fused aluminium oxide | available as Alodur ® WSK from Treibacher Schleifmittel AG, Austria in grit size F150 according to FEPA-Standard 44-1: 2006 |

-continued

| | |
|---|---|
| Mono-crystalline aluminium oxide | available as Alodur ® SCTSK from Treibacher Schleifmittel AG, Austria in grit size F180, and F220 according to FEPA-Standard 44-1: 2006 |
| Mix 1 - Example I-1 | 100% by weight 80+ based on the total weight of abrasive grain |
| Mix 2 - Comparative Example Ref. I-2 | 50% by weight of white fused aluminium oxide, and 50% by weight of monocrystalline aluminium oxide based on the total weight of abrasive grain The white fused aluminium oxide portion consists of 100% by weight of FEPA grade F150. The monocrystalline aluminium oxide portion consists of 60% by weight of FEPA grade F180, and 40% by weight of FEPA grade F220. |
| Vitrified bond precursor mix | Mix of 98.5% by weight vitrified bond having a grain size of 97% <63 μm and a composition consisting of $Na_2O$, $Al_2O_3$, $B_2O_3$, and $SiO_2$, commercially available as vitrified bond VO 82069 from Reimbold & Strick, Germany and 1.5% by weight of blue pigment, cobalt blue colour stain for glazes consisting of $CoAl_2O_4$, commercially available as K90084 from Reimbold & Strick, Germany |
| Temporary binder | Consisting of Liquid temporary binder mix and solid temporary binder |
| Liquid temporary binder mix | Urea formaldehyde resin*, for example Resin 1175G available from Chemoplastica Resins AB, Sweden |
| Solid temporary binder | Potato starch*, for example Dextrin 20.912 available from Agrana Starke GmbH, Austria |

*not present in the final product

Example I

Thread Grinding

A. Manufacturing Process of Abrasive Grinding Tools

Vitrified bonded abrasive grinding wheels having composition, type, dimension (wheel diameter×thickness×bore diameter), shape and bond as described in Table 1 were prepared as follows:

A. Manufacturing Process of Abrasive Grinding Wheels

Vitrified bonded abrasive grinding wheels having the same bond and wheel dimension of 350×12×160 mm (wheel diameter×thickness×bore diameter) and T1 shape (according to DIN:ISO 603:1999), i.e. a straight grinding wheel, were prepared according to the following manufacturing process:

(i) Mixing

The abrasive grain/grain mix as specified with respect to the examples was put into a mixing aggregate and the liquid temporary binder was poured onto it while mixing. After stirring for about 3-5 minutes, a mixture consisting of the vitrified bond precursor mix and the solid temporary binder was added and the mixing was continued thoroughly for about 10 minutes.

(ii) Sieving

With reference to the examples given, the mixture obtained in step (i) is screened with a sieve 16 mesh (mesh size 1.18 mm).

(iii) Moulding

The mixture obtained in step (ii) is put into a mould and formed by pressing to give green bodies. Typical forming pressures were 126-150 kg/cm$^2$ for green bodies with an abrasive mix containing 100% 80+ and 21-51 kg/cm$^2$ for green bodies with an abrasive mix containing 30% 80, 60+ or T shaped abrasive grain.

(iv) Heat Treatment

With reference to the examples given, the achieved green bodies are dried at a temperature of 130° C. and sintered at a temperature of 930° C.

(vii) Finishing

The finishing operation comprises the grinding of the bore, the lateral surfaces, and the peripheral surface.

| Amounts [wt. %]* | Example I-1 | Comparative Example Ref. I-2 |
|---|---|---|
| Green Structure | | |
| Abrasive Grain | Mix 1 | Mix 2 |
| Shaped abrasive grain | 86.63 80+ | |
| White fused aluminium oxide | | 44.21 F150 |
| Monocrystalline aluminium oxide | | 44.21 F180, F220 |
| Vitreous bond | 13.37 | 11.58 |
| Starch | 1.00 | 1.00 |
| Liquid temporary binder mix | 3.00 | 3.64 |
| Wheel | | |
| Moulding density [g/cm³] | 2.430 | 2.280 |
| Wheel Type** | Type II | Type I |
| Shape | T1sp, multi-rib wheel, 5 ribs | T1sp, multi-rib wheel, 5 ribs |
| Dimension | 350 × 12 × 160 | 350 × 12 × 160 |

*weight amounts of the green wheels before firing
**Here and in the following the Wheel Type (or the abrasive article or tool type) relates to the hardness/structure of the test abrasive tools and had been classified as a type ranging from Type I (lower volume percentage of bond and abrasive grain, and higher volume percentage of porosity) to Type II (higher volume percentage of bond and abrasive grain, and lower volume percentage of porosity) based on the percentage of bond and porosity in the abrasive tools (for example wheels or segments), with a higher volume percentage of bond corresponding to a higher type and a more rigid or hard abrasive tool.

For example with specific reference to Example I, i.e. Type II or Type I, test wheels of Type I can be considered as acting harder or more rigid under the grinding conditions used as compared to test wheels of Type II because of the higher volume percentage of bond and less porosity present in wheels of Type II.

B. Testing Procedure

The grinding wheels prepared as in Example I were tested in a thread grinding application in order to establish the grinding performance of the wheels.

Using the wheels of Example I, grinding tests were performed using the following grinding conditions:

Grinding Process: thread grinding; rough grinding, and finish grinding

Machine: SMS UL 900, adopted to customer needs (CNC-machine with controlled dresser spindle)

Workpiece: satellite spindle, Material: 1.5752 hardened to 58-62 HRc, thread with 5 starts, pitch diameter 20 mm, thread pitch 1 mm, thread length: 266 mm, cylindricity: 0.002 mm Parameters: rough grinding: infeed $a_e$ 0.27 mm, workpiece rotation 18 rpm, operating speed $v_c$ 30 m/s finish grinding: infeed $a_e$ 0.10 mm, workpiece rotation 10 rpm, operating speed $v_c$ 30 m/s Dressing: rotary dressing tool/diamond form dressing roll with CVD rods of size 0.6×0.6 mm; dressing parameters: dressing roll infeed per revolution $a_d$ 0.01 mm, speed of dressing tool $v_d$ 1 mm/s, asynchronous dressing with dressing speed ratio $q_d$ −0.8

C. Results

TABLE 2

Results of Example I

| | Comparative Example Ref. I-2 | Example I-1 |
|---|---|---|
| Roughing: | | |
| infeed $a_e$ [mm] | 0.27 | 0.27 |
| workpiece rotation [rpm] | 18 | 80 |
| operating speed $v_c$ [m/s] | 30 | 47 |
| Finishing: | | |
| infeed $a_e$ [mm] | 0.10 | 0.10 |
| workpiece rotation [rpm] | 10 | 30 |
| operating speed $v_c$ [m/s] | 30 | 35 |
| Dressing | 2 times | 1 time |
| Total grinding time per workpiece including dressing process [min:sec] | 10 | 03:13 |
| Root radius R(root) of thread [mm] | 0.20 | 0.15 |

Investigating the range of application the test wheel (Example I-1) gained improvements with regard to the parameter sets applied, the grinding time, and the number of grinding cycles as follows: The workpiece rotation was increased by ca. 345% in the rough grinding process and by 200% in the finish grinding process in comparison to the Comparative Example Ref. I-2. The operating speed was increased by ca. 57% in the rough grinding process and by ca. 17% in the finish grinding process. The number of dressing cycles was reduced by 50%. Increasing these parameters lead into a reduction of the total grinding time of ca. 68% Considering the root radius an improvement was observed. The root radius was determined as 0.15 mm. The maximum allowable root radius R(root) of the thread is 0.26 mm. No workpiece burning and clogging of the grinding wheel occurred. The described grinding conditions cannot be applied for the Comparative Example Ref. I-2 as the grinding tool would become overstressed showing i.e. a profile loss, break-out of abrasives, clogging, etc. and thus resulting in an insufficient grinding performance.

The invention claimed is:

1. A vitrified bonded abrasive article comprising:
   a plurality of shaped abrasive particles, wherein each shaped abrasive particle comprises a first side and a second side separated by an abrasive particle thickness t, wherein said first side comprises a first face having a perimeter of a first geometric shape, wherein said thickness t is equal to or smaller than the length of the shortest side-related dimension of the particle;
   a bonding medium comprising a vitreous bond, for the preparation of a bonded abrasive article;
   wherein the abrasive article is formed by compressing the plurality of shaped abrasive particles and the bonding medium with a mold such that the abrasive article comprises a surface profile along an article thickness, wherein the surface profile has a repeating pattern comprising a repeating feature, and wherein the abrasive article is configured to grind a workpiece along the article thickness such that a negative image of the repeating feature is imparted on a workpiece, and wherein the repeating feature is defined by a first point, a second point, and a third point, wherein the first point has a first radius measured from a center of the abrasive article, the second point has a second radius measured from the center of the abrasive article, and the third point has a third radius measured from the center of the abrasive article, and wherein the second radius is larger than the first radius and also larger than the third radius; and wherein each of the shaped abrasive particles has a largest dimension of about the same order of magnitude as a dimension of the repeating feature.

2. A bonded abrasive article comprising:

a plurality of shaped abrasive particles, said shaped abrasive particles each comprising a first side and a second side separated by a thickness t, wherein said first side comprises a first face having a perimeter of a first geometric shape, wherein said thickness t is equal to or smaller than the length of the shortest side-related dimension of the particle;

a bonding medium comprising a vitreous bond;

a surface profile and a grinding surface, wherein the grinding surface is configured to contact a workpiece and impart a negative image of the surface profile onto the workpiece; and wherein the surface profile comprises an edge with a plurality of indentations, wherein each of the shaped abrasive particles has a largest dimension of about the same order of magnitude as one of the plurality of indentations, wherein the surface feature repeats along the surface profile such that a pattern of ridges and valleys are ground into the workpiece.

3. The article according to claim 1, wherein the repeating feature is a male surface feature.

4. The article according to claim 3, wherein the height of a male surface feature has a dimension of about 0.1 to about 9 times the largest dimension of a shaped abrasive a particle.

5. The article according to claim 3, wherein said male surface feature exhibits a tip radius R(tip), wherein said tip radius R(tip) and the largest dimension $L_{max}$ of said shaped abrasive particles are characterized by R(tip)≤2 $L_{max}$.

6. The article according to claim 5 wherein said tip radius R(tip) and the largest dimension $L_{max}$ of said shaped abrasive particles are characterized by R(tip)<Lmax.

7. The article according to claim 3, wherein said male surface feature exhibits a corner radius R(corner), wherein said corner radius R(corner) and the largest dimension $L_{max}$ of said shaped abrasive particles are characterized by R(corner)≤2 Lmax.

8. The article according to claim 3, wherein said male surface feature exhibits a corner radius R(corner), wherein said corner radius R(corner) and the largest dimension $L_{max}$ of said shaped abrasive particles are characterized by R(corner)≤Lmax.

9. The article according to claim 1, wherein said surface profile has been at least partially imparted by dressing.

10. The article according to claim 1, further comprising modified shaped abrasive particles having a modified shape, wherein said modified shape has been derived from the original shape of said shaped abrasive particles by dressing.

11. The article according to claim 10, wherein at least some of said modified shaped abrasive particles contribute to the precision of said repeating feature.

12. The article according to claim 11 wherein said contributing modified shaped abrasive particles are located at or near the maximum of a repeating feature.

13. The article according to claim 1, wherein said repeating feature has a longitudinal axis.

14. The article according to claim 13, wherein the shape of said repeating feature is symmetrical to said longitudinal axis.

15. The article according to claim 14, wherein the shape of said repeating feature is not symmetrical to said longitudinal axis.

16. The article according to claim 1, wherein said repeating feature is selected from standard wheel faces B, C, D, E, F, M, N, P, as well as Form 1, Form 1E, Form 39, Form 39E, Form 1ESP or Form 1F, and others according to International Standard ISO 525:1999.

17. The article according to claim 1, comprising a plurality selected from two, three, four, five, six, seven, eight, nine, ten or even more of said repeating features.

18. The article according to claim 17 wherein said repeating features comprised by said plurality are identical.

19. The article according to claim 1, wherein the repeating pattern comprises a plurality of ridges and valleys.

20. The composition according to claim 1, wherein the repeating pattern comprises a plurality of sawteeth.

21. The article according to claim 1, wherein the repeating feature is a sawtooth.

22. A bonded abrasive article, the article comprising:

an active surface configured to engage a workpiece, wherein the active surface comprises a surface profile and an article thickness, wherein the bonded abrasive article is configured to engage the workpiece along the article thickness such that a negative image of the surface profile is imparted to the workpiece through an abrading operation, wherein the surface profile comprises a repeating pattern;

a plurality of shaped abrasive particles bonded within a binding medium, wherein each of the shaped abrasive particles comprising a first dimension, a second dimension, and a thickness, wherein the thickness is less than the first dimension; and wherein the repeating pattern comprises a sawtooth, and wherein the repeating pattern is configured to impact a threaded surface on a workpiece; and wherein the first dimension is about the same order of magnitude as the feature dimension.

* * * * *

UNITED STATES PATENT AND TRADEMARK OFFICE
CERTIFICATE OF CORRECTION

PATENT NO. : 10,471,571 B2
APPLICATION NO. : 14/773985
DATED : November 12, 2019
INVENTOR(S) : Walter Flaschberger et al.

Page 1 of 2

It is certified that error appears in the above-identified patent and that said Letters Patent is hereby corrected as shown below:

In the Specification

Column 1
Line 2, below "BONDED ABRASIVE ARTICLE" insert -- Cross Reference to Related Applications This application is a national stage filing under 35 U.S.C. 371 of PCT/IB2013/051942, filed March 12, 2013, the disclosure of which is incorporated by reference in its entirety herein. --.

Column 5
Line 56, delete "+/±20" and insert -- +/-20 --, therefor.

Column 12
Line 61, delete "E," and insert -- ε, --, therefor.

Column 14
Line 4, after "R(corner)" insert -- ≤0.6 --.

Column 20
Line 30, delete "+/±30" and insert -- +/-30 --, therefor.
Line 30, delete "+/±15," and insert -- +/-15, --, therefor.
Line 31, delete "+/±10" and insert -- +/-10 --, therefor.
Line 32, delete "0+/-5" and insert -- 0 to +/-5 --, therefor.

Column 27
Line 30, delete "that that" and insert -- that --, therefor.

Column 40
Line 47, delete "aL.);" and insert -- al.); --, therefor.

Signed and Sealed this
Seventh Day of July, 2020

Andrei Iancu
*Director of the United States Patent and Trademark Office*

Column 48
Line 7, delete "paradichlorbenzene)" and insert -- paradichlorobenzene) --, therefor.

Column 52
Line 54, delete "$L_{max}$, in" and insert -- $L_{max}$. In --, therefor.

Column 58
Line 42, delete "radius radius" and insert -- radius --, therefor.

In the Claims

Column 66
Line 55, in Claim 1, delete "with" and insert -- within --, therefor.

Column 67
Line 38, in Claim 6, delete "Lmax." and insert -- $L_{max}$. --, therefor.
Line 43, in Claim 7, delete "Lmax." and insert -- $L_{max}$. --, therefor.
Line 48, in Claim 8, delete "Lmax." and insert -- $L_{max}$. --, therefor.

Column 68
Line 48, in Claim 22, delete "impact" and insert -- impart --, therefor.